(12) United States Patent
Witz et al.

(10) Patent No.: US 12,257,750 B2
(45) Date of Patent: Mar. 25, 2025

(54) MOLDED ARTICLE WITH SELECTIVELY VARIED CORE LAYER GEOMETRY AND HOT RUNNER NOZZLES FOR PRODUCING SAME

(71) Applicant: Husky Injection Molding Systems Ltd., Bolton (CA)

(72) Inventors: Jean-Christophe Witz, Yutz (FR); Christophe Simone Pierre Beck, Terville (FR); Joachim Johannes Niewels, Thornton (CA); Lee Richard Riddle, Palgrave (CA)

(73) Assignee: Husky Injection Molding Systems Ltd., Bolton (CA)

( * ) Notice: Subject to any disclaimer, the term of this patent is extended or adjusted under 35 U.S.C. 154(b) by 0 days.

(21) Appl. No.: 18/498,127

(22) Filed: Oct. 31, 2023

(65) Prior Publication Data

US 2024/0059000 A1 Feb. 22, 2024

Related U.S. Application Data

(62) Division of application No. 16/623,145, filed as application No. PCT/CA2018/050756 on Jun. 21, 2018, now Pat. No. 11,850,779.

(Continued)

(51) Int. Cl.
*B29C 45/27* (2006.01)
*B29B 11/08* (2006.01)
(Continued)

(52) U.S. Cl.
CPC ............. *B29C 45/27* (2013.01); *B29B 11/08* (2013.01); *B29B 11/14* (2013.01);
(Continued)

(58) Field of Classification Search
CPC .... B29C 2049/023; B29C 2049/78705; B29C 2949/0715; B29C 2949/3004;
(Continued)

(56) References Cited

U.S. PATENT DOCUMENTS 4,977,005 A  12/1990 Krishnakumar et al.
5,126,177 A  6/1992 Stenger
(Continued)

FOREIGN PATENT DOCUMENTS

CN  1092352 A  9/1994
CN  101151151 A  3/2008
(Continued)

OTHER PUBLICATIONS

Kris Akkapeddi and Brian Lynch, Compatibilizer Additives for Improving the Delamination Resistance of PET/PA-MXD6 Multilayer Coinjection Stretch Blow Molded Bottles, 1994, 4 pages, Graham Packaging Co., York PA 17402 USA.
(Continued)

*Primary Examiner* — Yan Lan
(74) *Attorney, Agent, or Firm* — Wolf, Greenfield & Sacks, P.C.

(57) ABSTRACT

A molded article suitable for subsequent blow-molding into a final-shaped container. The article includes a neck portion; a gate portion; and a body portion extending between the neck portion and the gate portion, at least a majority of the body portion having an overall shape which is symmetric about a body axis extending longitudinally through a center of the body portion. The body portion includes an inner exterior layer and an outer exterior layer of a first polymeric material; and a core layer of a second polymeric material disposed between the inner exterior layer and the outer exterior layer. A radial thickness or a material of the core layer is selectively varied to govern non-uniform blow (Continued)

molding of the molded article into the final-shaped container.

8 Claims, 29 Drawing Sheets

Related U.S. Application Data

(60) Provisional application No. 62/523,875, filed on Jun. 23, 2017.

(51) Int. Cl.
*B29B 11/14* (2006.01)
*B29C 45/16* (2006.01)
*B29K 67/00* (2006.01)
*B29L 31/00* (2006.01)

(52) U.S. Cl.
CPC .. *B29C 45/1684* (2013.01); *B29C 2949/3014* (2022.05); *B29C 2949/3018* (2022.05); *B29C 2949/3028* (2022.05); *B29C 2949/3036* (2022.05); *B29K 2067/003* (2013.01); *B29L 2031/7158* (2013.01)

(58) Field of Classification Search
CPC .... B29C 2949/3006; B29C 2949/3012; B29C 2949/3014; B29C 2949/3016; B29C 2949/3018; B29C 2949/3028; B29C 2949/3036; B29C 45/1684; B29C 45/27; B29C 49/071; B29B 11/08; B29B 11/14; B29K 2067/003; B29K 2105/258; B29L 2031/7158
See application file for complete search history.

(56) References Cited

U.S. PATENT DOCUMENTS

| | | | |
|---|---|---|---|
| 5,628,957 A | 5/1997 | Collette et al. | |
| 5,891,381 A | 4/1999 | Bemis et al. | |
| 5,976,653 A | 11/1999 | Collette et al. | |
| 6,090,460 A | 7/2000 | Collette et al. | |
| 6,217,818 B1 | 4/2001 | Collette et al. | |
| 6,548,133 B2 | 4/2003 | Schmidt et al. | |
| 6,596,213 B2 | 7/2003 | Swenson | |
| 7,357,967 B2 | 4/2008 | Osika et al. | |
| 7,897,222 B2 | 3/2011 | Witz et al. | |
| 7,927,678 B2 | 4/2011 | Mitadera et al. | |
| 7,976,919 B2 | 7/2011 | Sato et al. | |
| 8,075,966 B2 | 12/2011 | Bourgeois | |
| 8,757,998 B2 | 6/2014 | Ten et al. | |
| 2010/0028577 A1 | 2/2010 | Siegl | |
| 2010/0286317 A1 | 11/2010 | Sato et al. | |
| 2011/0262668 A1 | 10/2011 | Akkapeddi et al. | |
| 2014/0248385 A1 | 9/2014 | Ten et al. | |

FOREIGN PATENT DOCUMENTS

| | | |
|---|---|---|
| CN | 2011800557325 A | 9/2011 |
| EP | 1449646 B1 | 5/2008 |
| EP | 2047966 B1 | 8/2013 |
| EP | 2693493 A1 | 2/2014 |
| EP | 3015244 A1 | 5/2016 |
| FR | 2898293 A1 | 9/2007 |
| JP | S4932963 A | 3/1974 |
| JP | S6294541 A | 5/1987 |
| JP | H08216233 A | 8/1996 |
| JP | 2008307847 A | 12/2008 |
| JP | 2010012605 A | 1/2010 |
| WO | 9906202 A1 | 2/1999 |
| WO | 2012037682 A2 | 3/2012 |
| WO | 2018064751 A1 | 4/2018 |
| WO | 2018090128 A1 | 5/2018 |
| WO | 2018098563 A1 | 6/2018 |

OTHER PUBLICATIONS

Sanjiv S. Dagli and Kunal M. Kamdar, Effects of Component Addition Protocol on the Reactive Compatibilization of HDPE/PET Blends, Polymer Engineering and Science, Mid-Dec. 1994, 11 pages, vol. 34, No. 23, Polymer Processing Institute, Castle Point on the Hudson, Hoboken, New Jersey, 07030.

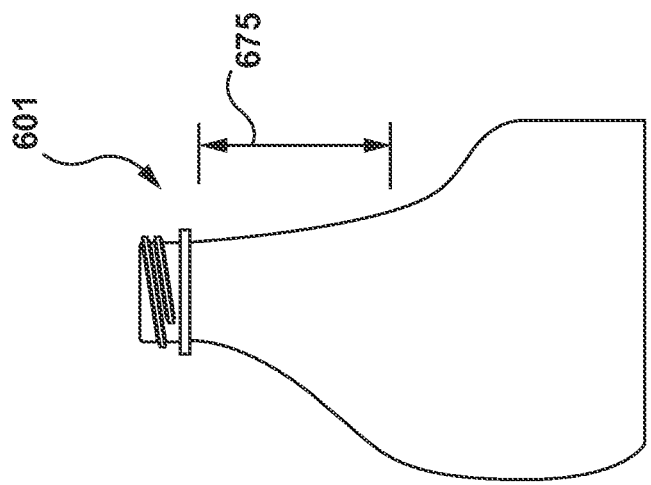
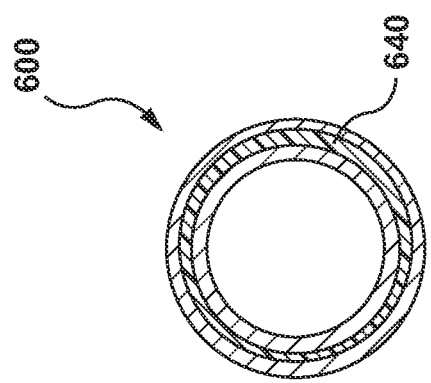
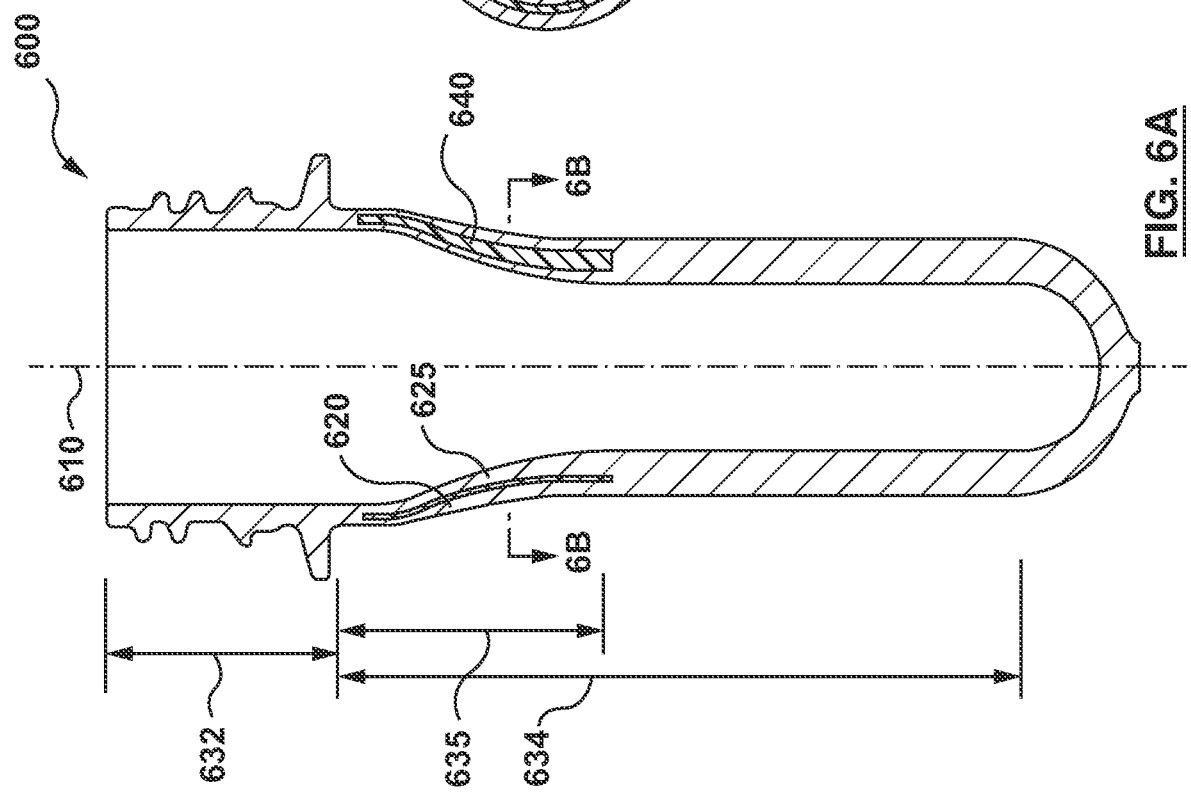

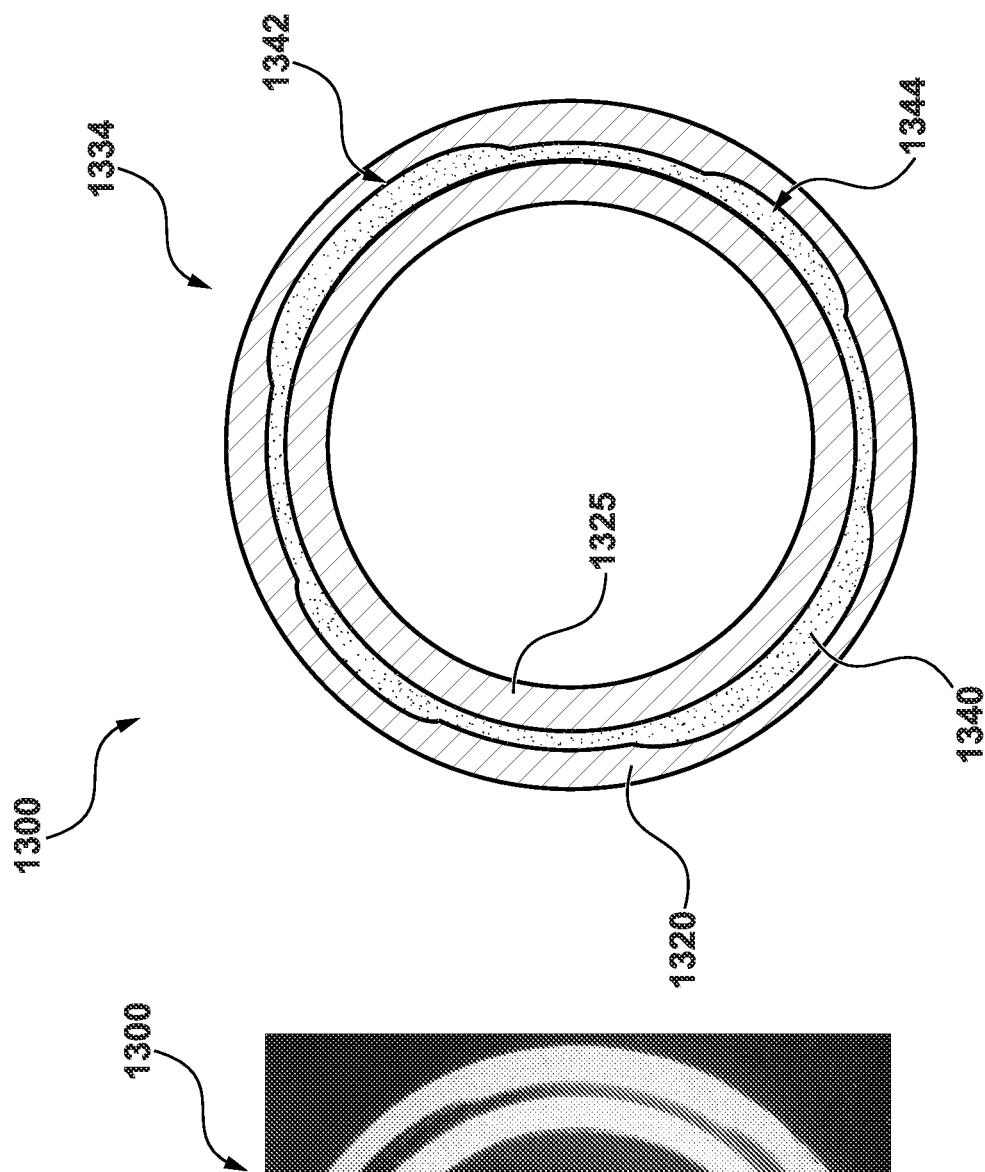
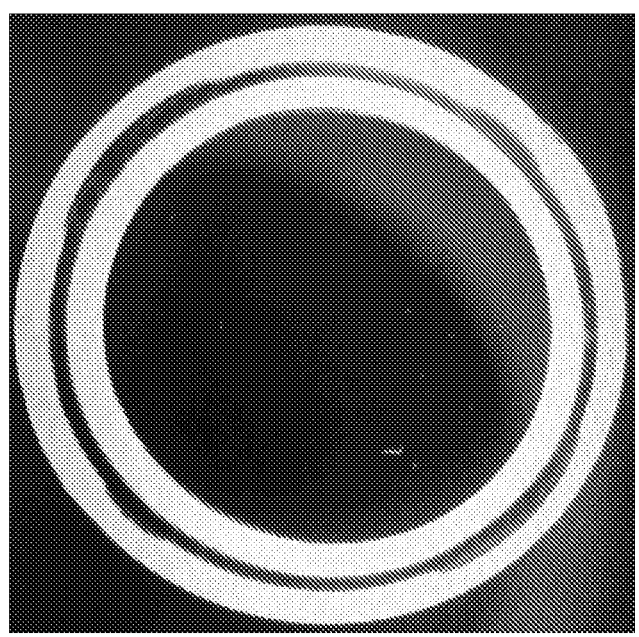
FIG. 16B
FIG. 16A

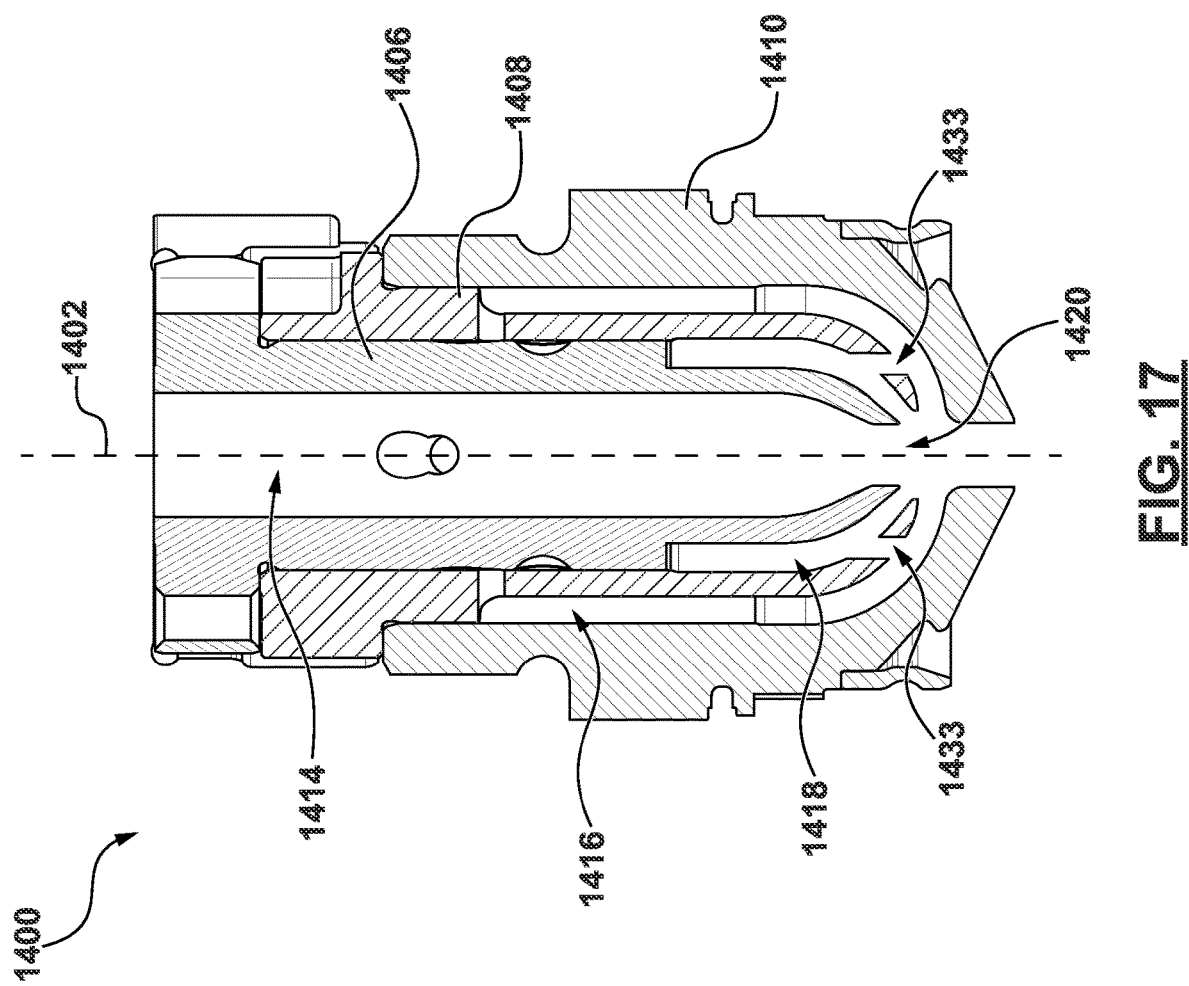

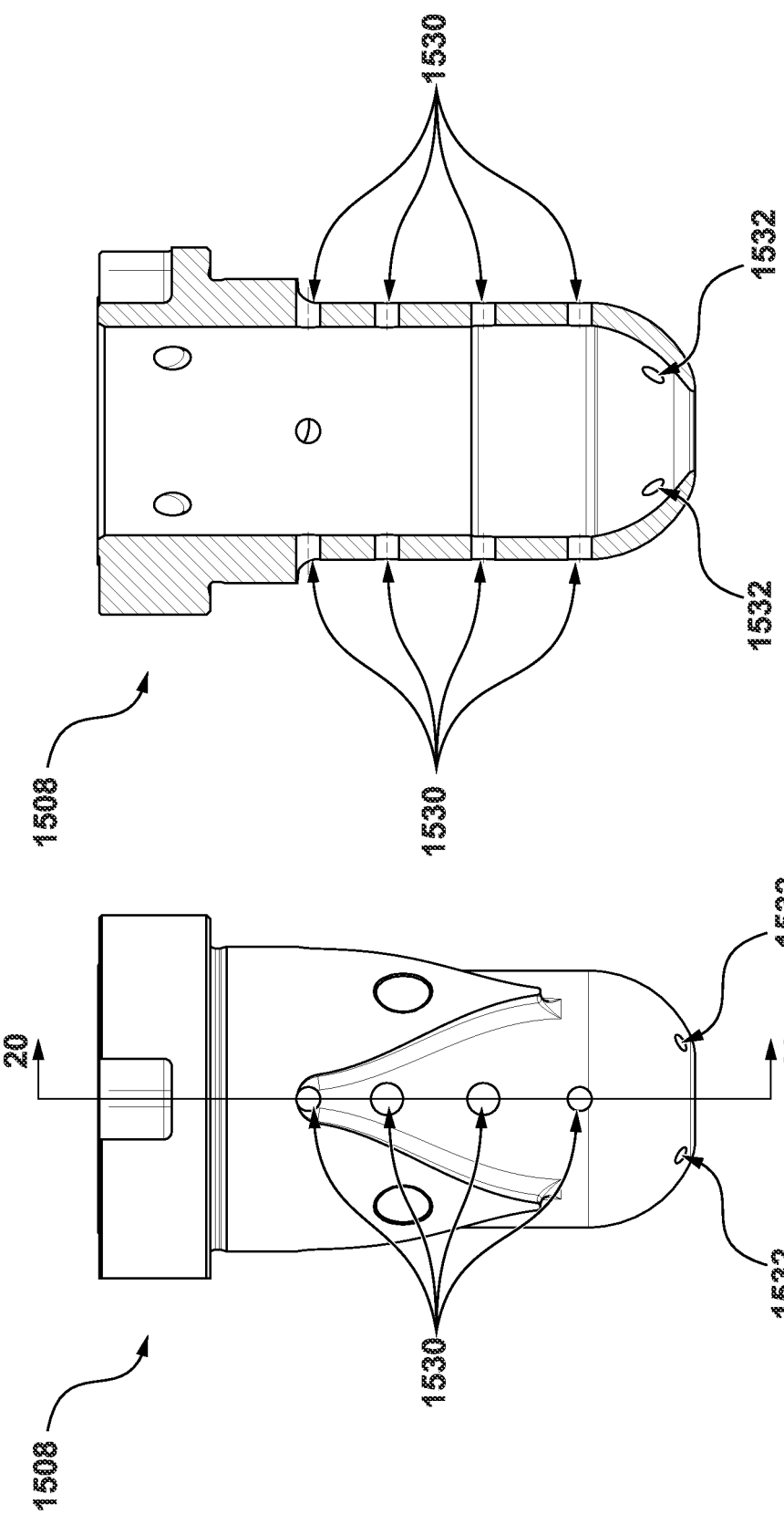

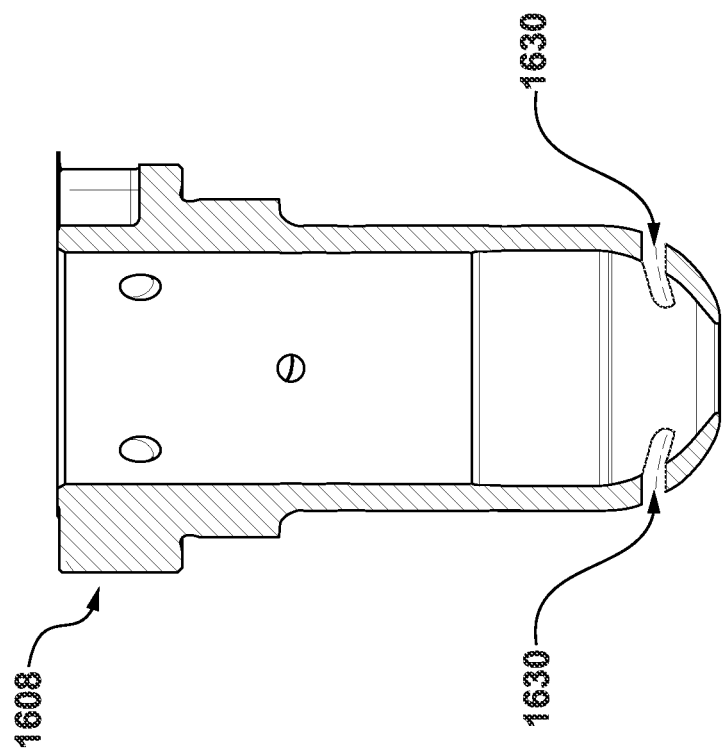
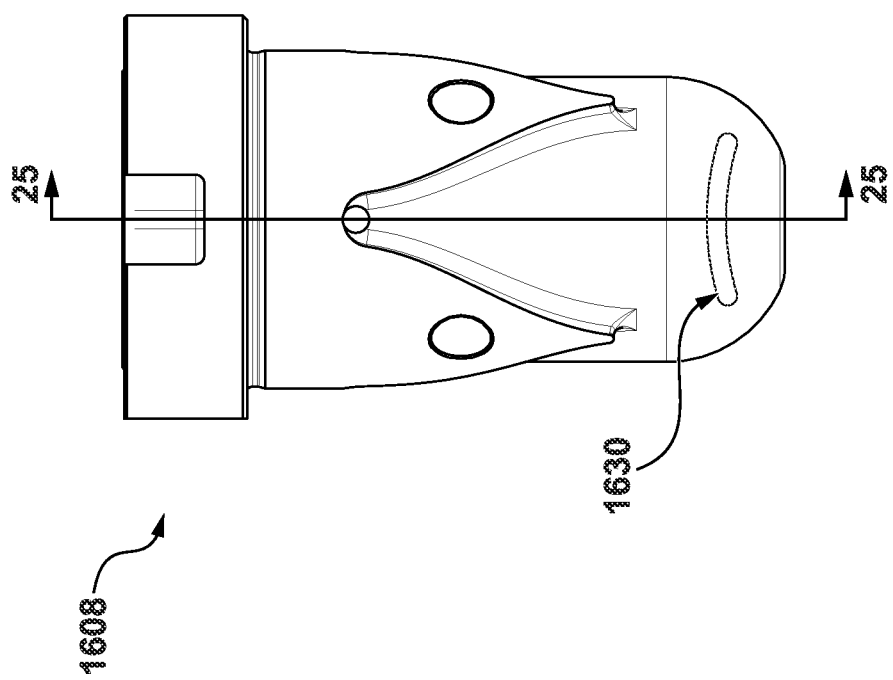

MOLDED ARTICLE WITH SELECTIVELY VARIED CORE LAYER GEOMETRY AND HOT RUNNER NOZZLES FOR PRODUCING SAME

CROSS-REFERENCE TO RELATED APPLICATIONS

This application is a divisional of U.S. patent application Ser. No. 16/623,145 filed Dec. 16, 2019, which is the U.S. National Stage of PCT/CA2018/050756, filed Jun. 21, 2018, which claims priority from U.S. Provisional patent application Ser. No. 62/523,875 filed Jun. 23, 2017, the disclosures of which are incorporated herein by reference.

FIELD OF THE TECHNOLOGY

The present technology relates to multi-layer molded articles suitable for subsequent blow-molding into final-shaped containers. More specifically the present technology relates to molded articles with core layers that are formed to selectively affect subsequent blow molding properties when the multi-layer molded article is processed into the final-shaped container.

BACKGROUND

Molding is a process by virtue of which a molded article can be formed from molding material by using a molding system. Various molded articles can be formed by using the molding process, such as an injection molding process. One example of a molded article that can be formed, for example, from polyethylene terephthalate (PET) material, is a preform that is capable of being subsequently blown into a beverage container, such as, a bottle and the like. In other words, the preform is an intermediary product that is then processed into the final-shaped container by a stretch blow-molding process (as an example). During the stretch blow-molding process, the material of the preform behaves with certain properties (such as stretch ratio, which depends on the reheating temperature, etc).

As one can appreciate, a typical preform is circularly-symmetric around its longitudinal axis. Some final-shaped molded articles are also circularly-symmetric. For example, a beverage container (a bottle) for still or sparkling beverage is substantially symmetric around its longitudinal axis (when standing on a shelf, for example). Other finally-shaped containers are not circularly-symmetric. Examples of such non-circularly-symmetric finally-shaped containers include, but are not limited to: containers for household cleaning liquids (such as glass cleaning liquid, toilet bowl cleaning liquids, etc.), containers for personal care products (shampoos, conditioners, etc.) and the like.

Blow-molding a symmetric preform into an asymmetric container may induce structural and/or stretch blow-molding process related challenges, such as weaker walls where the preform has been expanded the most.

Some of the preforms (and hence the finally-shaped containers) are made from a single molding material. Such as, the aforementioned preforms that are stretch blow-molded into beverage container for still or sparkling beverages are typically made from a single material—PET. PET is well suited for such applications. However, PET is not suited ideally for other applications. For that matter, for certain applications, no single material is a viable option (either because it lacks certain properties or because it would be commercially non-viable). It is, thus, also known to create multi-material preforms, where another material (typically called a "core material") is added and "sandwiched" between inner and outer layers of one or more other material(s).

As an example, certain materials can be chosen as the core layer to enhance oxygen impermeability (e.g. barrier material, such as EVOH or PGA), to enhance light impermeability, or the like.

SUMMARY

It is an object of the present invention to ameliorate at least some of the inconveniences present in the prior art.

Without wishing to be bound to any specific theory, embodiments of the present technology have been developed based on developers' appreciation that geometry of the core/barrier layer can be instrumental in selectively controlling stretching or blow-molding of a final-shaped container. The developers have further appreciated that controlled non-uniform geometry of the core layer can be utilized for aesthetic purposes, including creating selective color variation in the final-shaped container.

According to a first broad aspect of the present technology, there is provided a molded article suitable for subsequent blow-molding into a final-shaped container. The article includes a neck portion; a gate portion; and a body portion extending between the neck portion and the gate portion, at least a majority of the body portion having an overall shape which is symmetric about a body axis extending longitudinally through a center of the body portion, at least the body portion including an inner exterior layer and an outer exterior layer of a first polymeric material; and a core layer of a second polymeric material disposed between at least a portion of the inner exterior layer and the outer exterior layer, a radial thickness of the core layer being selectively varied to govern non-uniform blow molding of the molded article into the final-shaped container.

In some embodiments of the molded article, the rate of thermal crystallization of the first polymeric material is substantially less than that of the second polymeric material; and the second polymeric material includes at least one of a strain-crystallizable homopolymer, copolymer, and blend of polyethylene terephthalate (PET).

In some embodiments of the molded article, at least a majority of the neck portion is composed of the first polymeric material and is free of the second polymeric material.

In some embodiments of the molded article, the second polymeric material has a substantially higher intrinsic viscosity than the first polymeric material.

In some embodiments of the molded article, the radial thickness of the core layer varies about the body axis.

In some embodiments, the core layer has localized regions of increased radial thickness.

In some embodiments of the molded article, the radial thickness of the core layer has a non-symmetrical annular form about the body axis.

In some embodiments of the molded article, the radial thickness of the core layer has a symmetrical annular form about the body axis.

In some embodiments of the molded article, the core layer has a semi-annular core layer.

In some embodiments of the molded article, the radial thickness of the core layer varies in an axial direction.

In some embodiments of the molded article, the core layer is interrupted such that the radial thickness of the core layer decreases to zero at least one location; and the inner exterior layer and the outer exterior layer are in contact at the at least one location.

In some embodiments of the molded article, the molded article further includes a transition portion extending between the neck portion and the body portion; and wherein the transition portion includes a transition inner layer and a transition outer layer of the first polymeric material; and a transition core layer of the second polymeric material disposed between at least a portion of the inner exterior layer and the outer exterior layer.

In some embodiments of the molded article, the transition core layer is interrupted such that the radial thickness of the transition core layer decreases to zero at least one location.

According to another broad aspect of the present technology, there is provided a molded article suitable for subsequent blow-molding into a final-shaped container. The molded article includes a neck portion; a gate portion; and a body portion extending between the neck portion and the gate portion, at least the body portion including an inner exterior layer and an outer exterior layer of a first polymeric material; and a core layer of a second polymeric material disposed between at least a portion of the inner exterior layer and the outer exterior layer, the rate of thermal crystallization of the first polymeric material being substantially less than that of the second polymeric material, the second polymeric material including at least one of a strain-crystallizable homopolymer, copolymer, and blend of polyethylene terephthalate (PET).

According to yet another broad aspect of the present technology, there is provided a molded article suitable for subsequent blow-molding into a final-shaped container. The molded article includes a neck portion; a gate portion; and a body portion extending between the neck portion and the gate portion, at least the body portion including an inner exterior layer and an outer exterior layer of a first polymeric material; and a core layer of a second polymeric material disposed between at least a portion of the inner exterior layer and the outer exterior layer, the second polymeric material having a substantially higher intrinsic viscosity than the first polymeric material.

According to yet another broad aspect of the present technology, there is provided a molded article suitable for subsequent blow-molding into a final-shaped container. The molded article includes a neck portion; a gate portion; and a body portion extending between the neck portion and the gate portion, at least a majority of the body portion having an overall shape which is symmetric about a body axis extending longitudinally through a center of the body portion, at least the body portion including: an inner exterior layer and an outer exterior layer of a first polymeric material; and a core layer of a second polymeric material disposed between at least a portion of the inner exterior layer and the outer exterior layer, a radial thickness of the core layer being selectively varied to produce variation in color distribution in the final-shaped container.

In some embodiments, the first polymeric material has a first color; and the second polymeric material has a second color different from the first color.

In some embodiments, the radial thickness of the core layer varies about the body axis.

In some embodiments, the radial thickness of the core layer has a non-symmetrical annular form about the body axis.

In some embodiments, the core layer has localized regions of increased radial thickness.

According to yet another broad aspect of the present technology, there is provided a hot runner nozzle for conveying melt to a mold cavity. The hot runner nozzle includes an inner nozzle insert defining an inner flow channel; an intermediate nozzle insert disposed around the inner nozzle insert, the intermediate nozzle insert and the inner nozzle insert defining an intermediate flow channel; and an outer nozzle insert disposed around the intermediate nozzle insert, the outer nozzle insert and the intermediate nozzle insert defining an outer flow channel, the intermediate nozzle insert and the inner nozzle insert cooperating to define an intermediate outlet, at least one of the inner nozzle insert and the intermediate nozzle insert further defining at least one aperture disposed upstream from the intermediate outlet, at least one aperture being arranged to fluidly connect with at least one of the inner flow channel and the outer flow channel.

In some embodiments, in use, when conveying the melt to the mold cavity: a first stream of melt of a first polymeric material flows through and exits the inner flow channel and the outer flow channel; a second stream of melt of a second polymeric material flows through the intermediate flow channel; and at least a portion of the second stream of melt passes through the at least one aperture from the intermediate flow channel to at least one of the inner flow channel and the outer flow channel.

In some embodiments, the intermediate nozzle insert defines the at least one aperture; and when in use, at least a portion of the second stream of melt passes through the at least one aperture from the intermediate flow channel to the outer flow channel.

In some embodiments, the at least one aperture includes a first plurality of apertures defined along a first line extending longitudinally along the intermediate nozzle insert; and a second plurality of apertures defined along a second line extending longitudinally along the intermediate nozzle insert, the first line and the second line being separate from each other.

In some embodiments, the inner nozzle insert defines the at least one aperture; and when in use, at least a portion of the second stream of melt passes through the at least one aperture from the intermediate flow channel to the inner flow channel.

In some embodiments, the at least one aperture includes a first plurality of apertures defined along a first line extending longitudinally along the inner nozzle insert; and a second plurality of apertures defined along a second line extending longitudinally along the inner nozzle insert, the first line and the second line being separate from each other.

In some embodiments, the mold cavity is for defining, in use, a molded article having a core layer and a skin layer surrounding the core layer, the core layer being formed from the second polymeric material flowing through the intermediate flow channel, the core layer having a non-uniform radial thickness about a longitudinal axis of the molded article.

In some embodiments, the at least one aperture includes a plurality of apertures that fluidly connect the intermediate flow channel with at least one of the inner flow channel and the outer flow channel.

According to yet another broad aspect of the present technology, there is provided a hot runner nozzle for conveying melt to a mold cavity. The hot runner nozzle includes an inner nozzle insert defining an inner flow channel, the inner flow channel including an inner outlet; an intermediate nozzle insert disposed around the inner nozzle insert, the intermediate nozzle insert and the inner nozzle insert defining an intermediate flow channel, the intermediate flow channel including an intermediate outlet; and an outer nozzle insert disposed around the intermediate nozzle insert, the outer nozzle insert and the intermediate nozzle insert defining an outer flow channel, the outer flow channel including an outer outlet, the inner nozzle insert being formed such that the intermediate outlet has a non-uniform cross-section.

In some embodiments, the mold cavity is for defining, in use, a molded article having a core layer and a skin layer surrounding the core layer, the core layer being formed from material flowing through the intermediate flow channel, the material having a non-uniform radial thickness about the axis.

In some embodiments, the inner outlet, the intermediate outlet, and the outer outlet are immediately adjacent to one another.

In some embodiments, the inner nozzle insert is formed such that the intermediate outlet extends only partially around a longitudinal axis of the hot runner nozzle.

In some embodiments, the inner nozzle insert has an exterior surface partially defining the intermediate flow channel; and the exterior surface has an elliptical form, a center of the elliptical form surface being off-center from a longitudinal axis of the hot runner nozzle.

In some embodiments, the inner outlet and the outer outlet are arranged concentrically.

In some embodiments, the intermediate outlet is disposed between a portion of the concentrically arranged inner and outer outlets.

In some embodiments, in use, when transferring the melt to the mold cavity: a first stream of melt of a first polymeric material flows through and exits the inner flow channel and the outer flow channel; a second stream of melt of a second polymeric material flows through and exits the intermediate flow channel, the second polymeric material forming a core layer of a molded product produced by the melt in the mold cavity; and the first stream of melt and the second stream of melt intersect at a combination area.

In some embodiments, the mold cavity is for defining, in use, a molded article having a core layer and a skin layer surrounding the core layer, the core layer being formed from the second polymeric material flowing through the intermediate flow channel, the core layer having a non-uniform radial thickness about a longitudinal axis of the molded article.

According to yet another broad aspect of the present technology, there is provided a hot runner nozzle for conveying melt to a mold cavity. The hot runner nozzle includes an inner nozzle insert defining an inner flow channel; an intermediate nozzle insert disposed around the inner nozzle insert, the intermediate nozzle insert and the inner nozzle insert defining an intermediate flow channel; and an outer nozzle insert disposed around the intermediate nozzle insert, the outer nozzle insert and the intermediate nozzle insert defining an outer flow channel, flow of material through the intermediate flow channel, when the hot runner nozzle is in use, being non-uniformly distributed about a longitudinal axis of the hot runner nozzle, the non-uniformity of the flow being attributable to surfaces of the intermediate nozzle insert and the inner nozzle which define the intermediate flow channel, the mold cavity being for defining, in use, a molded article having a core layer and a skin layer surrounding the core layer, the core layer formed from material flowing through the intermediate flow channel, the core layer having a non-uniform radial thickness about a longitudinal axis of the molded article.

These and other aspects and features of non-limiting embodiments of the present technology will now become apparent to those skilled in the art upon review of the following description of specific non-limiting embodiments of the technology in conjunction with the accompanying drawings.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

A better understanding of the embodiments of the present technology (including alternatives and/or variations thereof) may be obtained with reference to the detailed description of the non-limiting embodiments along with the following drawings, in which:

FIG. 6A is a longitudinal cross-sectional view of a multilayer preform according to yet another embodiment of the present technology;

FIG. 6B is a horizontal cross-sectional view of the multilayer preform of FIG. 6A, taken along line 6B-6B of FIG. 6A;

FIG. 6C is a front side elevation view of a blow-molded product blown from the preform of FIG. 6A;

FIG. 16A is a photograph, produced by a backlit optical comparator, of a cross-section of another non-limiting embodiment of a molded article according to the present technology;

FIG. 16B is a line drawing representation of the cross-section of FIG. 16A;

FIG. 17 is a cross section of another embodiment of a hot runner nozzle (the cross section being taken along an operational axis of the hot runner nozzle), the hot runner nozzle being suitable for implementing embodiments of the present technology;

FIG. 19 is a side view of another embodiment of an intermediate nozzle insert of a hot runner nozzle, the nozzle insert and the hot runner nozzle being suitable for implementing embodiments of the present technology;

FIG. 20 is a cross-sectional view of the intermediate nozzle insert of FIG. 19, taken along line 20-20 of FIG. 19;

FIG. 24 is a side view of yet another embodiment of an intermediate nozzle insert of a hot runner nozzle, the nozzle insert and the hot runner nozzle being suitable for implementing embodiments of the present technology;

FIG. 25 is a cross-sectional view of the intermediate nozzle insert of FIG. 24, taken along line 25-25 of FIG. 24;

DETAILED DESCRIPTION

Figure 1:
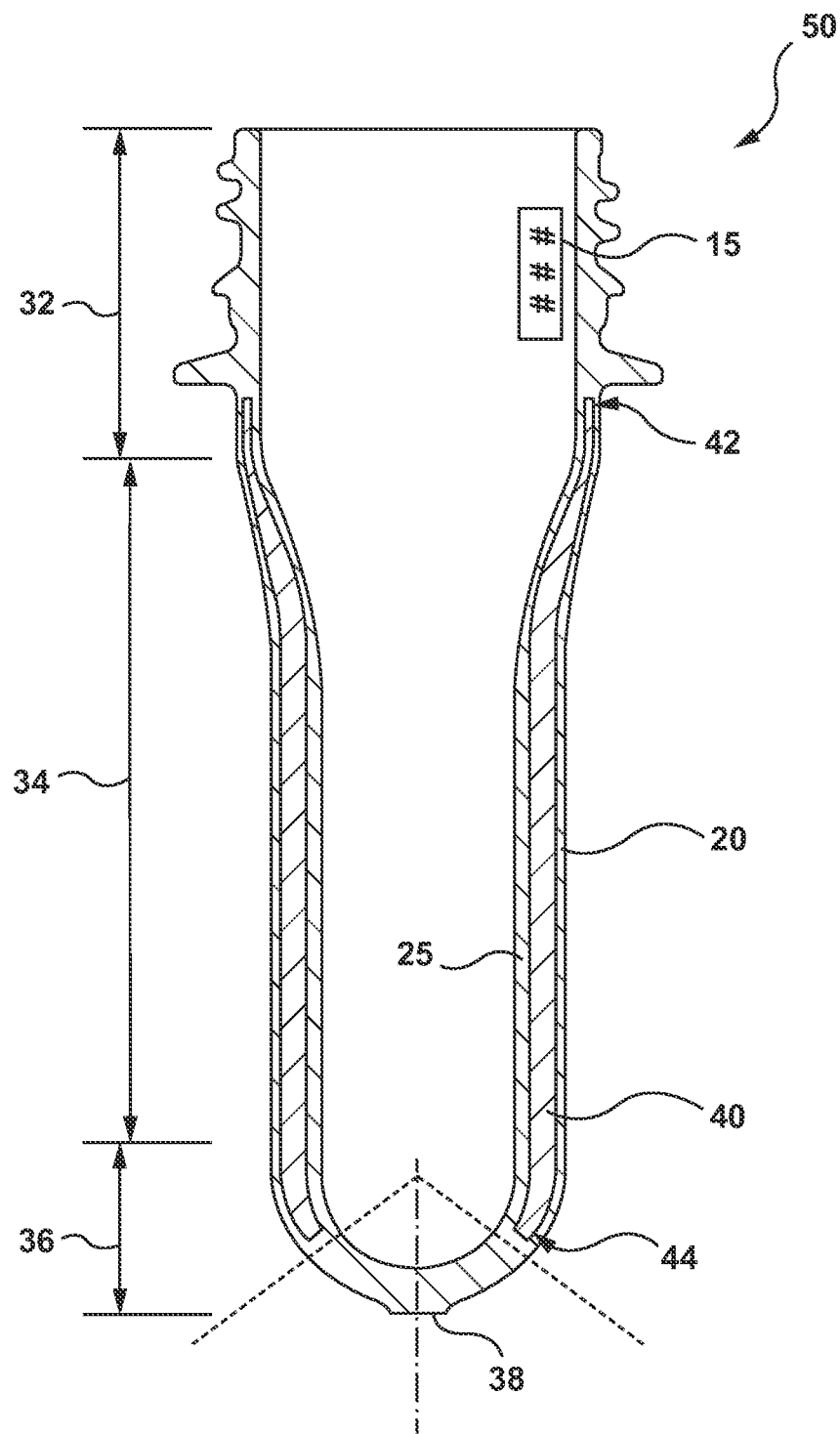
FIG. 1 is a cross-sectional view of a multilayer preform as known in the prior art.

With reference to FIG. 1, there is depicted a molded article 50 in cross-section, specifically a multilayer preform 50, produced by a molding machine as known in the prior art. The prior art multilayer preform 50 is described herein to provide a general structure of a molded article suitable for subsequent blow-molding; specifics of molded articles according to the present technology will be described in more detail below.

The multilayer preform 50 is produced by an injection molding machine 100, described below with reference to FIG. 2. It is contemplated that multilayer preforms 50 could be produced by another type of molding machine (such as extrusion blow-molding, transfer-blow molding and the like).

The multilayer preform 50 consists of a neck portion 32, a gate portion 36 (i.e. "base") and a body portion 34 extending between the neck portion 32 and the gate portion 36. The gate portion 36 is associated with a substantially spherical shape that terminates in a vestige portion 38. Naturally, the gate portion 36 can be executed in another form-factor (such as substantially conical, frusto-conical or the like). The body portion 34 of the multilayer preform 50 is formed by three layers. As will be described below, portions of the body portion 34 could be formed by more or fewer layers, depending on the implementation.

On exterior sides, the body portion 34 has an outer exterior skin layer 20 and an inner exterior skin layer 25. The skin layers 20, 25 can be made of various materials. For example, in multilayer preforms 50 for making beverage containers, the skin layers 20, 25 are made of virgin polyethylene terephthalate (PET), which is approved by the FDA for use in contact with foodstuffs. It is contemplated that the skin layers 20, 25 could be made of various other materials, including any appropriate polymer resins and thermoplastics, as will be appreciated by those skilled in the art.

The multilayer preform 50 has a cavity identification number 15 imprinted in the skin layer 25. Even though the cavity identification number 15 is depicted to be located in the neck portion 32, this does not need to be so in alternative embodiments of the present technology. In alternative embodiments, the cavity identification number 15 can be located anywhere within the gate portion 36 or the body portion 34. It is noted that the cavity identification number 15 can be omitted altogether.

As will be described below, each cavity 118 of one or more mold cavities 118 of the injection molding machine 100 has a cavity origin insert which imprints the cavity identification number 15 of each cavity 118, each cavity identification number 15 being unique to each cavity 118.

The skin layers 20, 25 surround a core layer 40. The core layer 40 is generally made of a different material, or a different state of the same material, than the skin layers 20, 25. At a top end of the preform 50, the core layer 40 begins at a leading edge 42. At a bottom end (typically called a "gate portion") of the preform 50, the core layer 40 terminates at a trailing edge 44 (i.e. "open dome"). In other non-limiting embodiments, not shown, the core layer may extend around the entirety of the gate portion (i.e. "encapsulated"). As will be described below, the core layer 40 is used to impart different properties to the preforms 50, such as increased rigidity. The core layer 40, in some embodiments, can act as a barrier layer in the eventual blow-molded container blown from the preform 50. In such cases, the barrier layer can help to prevent transmission of, for example, oxygen or light into an interior of the blow-molded container. The core layer 40 can also be made from any one of various appropriate thermoplastics and polymer resins as will be appreciated by those skilled in the art. It is contemplated that the core layer 40 could also contain various additives, coloring, or property adjusting agents to affect different properties of the multilayer preform 50.

Figure 2:
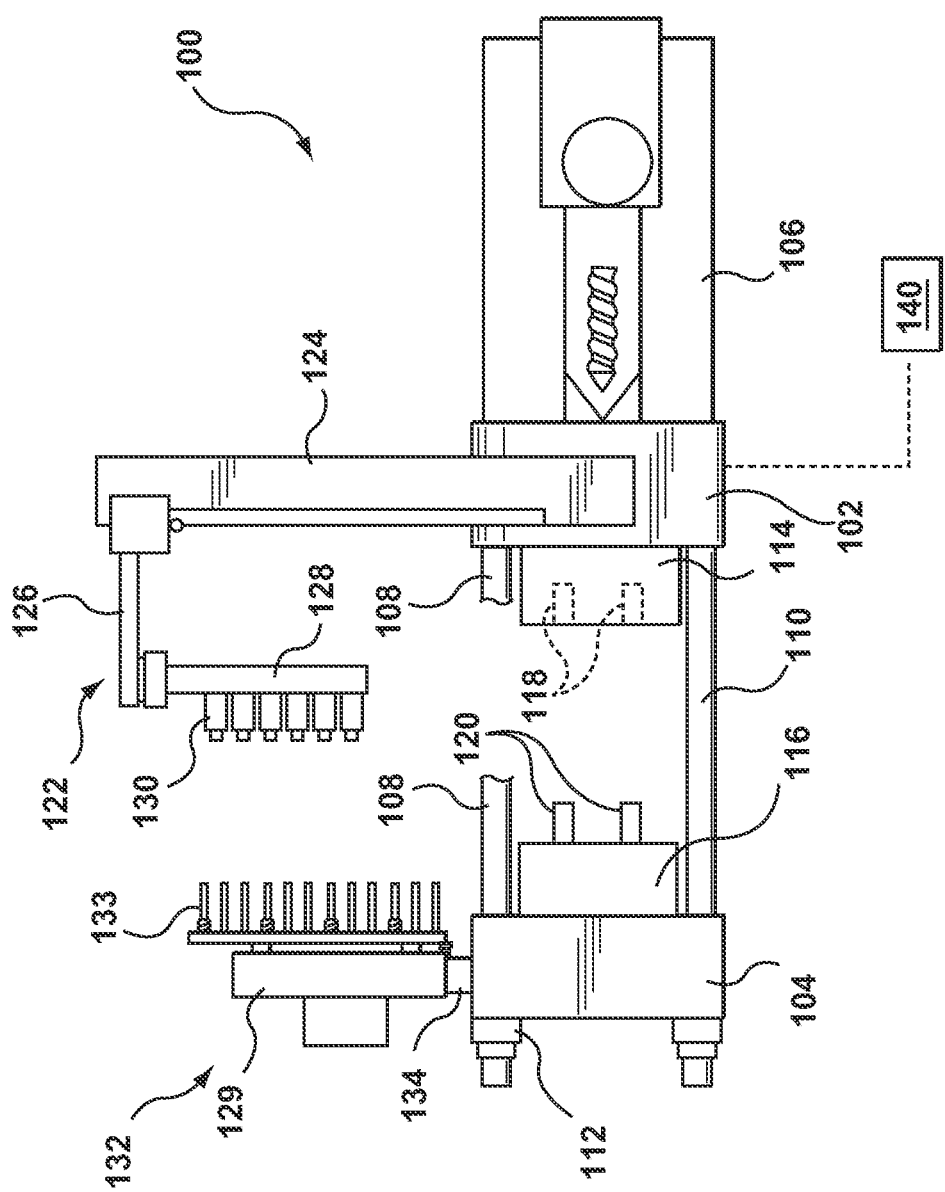
FIG. 2 is a top view schematic diagram of an injection molding machine, which can be adapted for producing implementations of the non-limiting embodiments of the present technology.

With reference to FIG. 2, there is depicted a non-limiting embodiment of the injection molding machine 100 which can be adapted to produce molded articles according to embodiments of the present technology. However, it should be understood that in alternative non-limiting embodiments, the injection molding machine 100 may comprise other types of molding systems, such as, but not limited to, compression molding systems, compression injection molding systems, transfer molding systems, metal molding systems and the like.

As seen in FIG. 2, the injection molding machine 100 comprises a fixed platen 102 and a movable platen 104. In some embodiments of the present technology, the injection molding machine 100 may include a third non-movable platen (not depicted). Alternatively or additionally, the injection molding machine 100 may include turret blocks, rotating cubes, turning tables and the like (all not depicted but known to those of skill in the art).

The injection molding machine 100 further comprises an injection unit 106 for plasticizing and injection of the molding material. The injection unit 106 can be implemented as a single stage or a two-stage injection unit. The injection molding machine 100 can included two instances of the injection unit 106—each one for preparing and injection a different type of molding material, i.e. a first molding material and a second molding material.

In operation, the movable platen 104 is moved towards and away from the fixed platen 102 by means of stroke cylinders (not shown) or any other suitable means. Clamp force (also referred to as closure or mold closure tonnage) can be developed within the injection molding machine 100, for example, by using tie bars 108, 110 (typically, four tie bars 108, 110 are present in the injection molding machine 100) and a tie-bar clamping mechanism 112, as well as (typically) an associated hydraulic system (not depicted) that is usually associated with the tie-bar clamping mechanism 112. It will be appreciated that clamp tonnage can be generated using alternative means, such as, for example, using a column-based clamping mechanism, a toggle-clamp arrangement (not depicted) or the like.

A first mold half 114 can be associated with the fixed platen 102 and a second mold half 116 can be associated with the movable platen 104. In the non-limiting embodiment of FIG. 2, the first mold half 114 comprises the one or more mold cavities 118. As will be appreciated by those of skill in the art, the one or more mold cavities 118 may be formed by using suitable mold inserts (such as a cavity insert, a gate insert and the like) or any other suitable means. As such, the first mold half 114 can be generally thought of as a "mold cavity half".

The second mold half 116 comprises one or more mold cores 120 complementary to the one or more mold cavities 118. As will be appreciated by those of skill in the art, the one or more mold cores 120 may be formed by using suitable mold inserts or any other suitable means. As such, the second mold half 116 can be generally thought of as a "mold core half". Even though not depicted in FIG. 2, the first mold half 114 may be further associated with a melt distribution network, commonly known as a hot runner, for distributing molding material from the injection unit 106 to each of the one or more mold cavities 118. The melt distribution network comprises one or more hot runner nozzle, which will be described in greater detail herein below.

Also, the second mold half 116 is provided with neck rings (not depicted) produce preforms with the neck portions 32. The second mold half 116 is provided with the cavity origin insert for imprinting the cavity identification number 15 on the multilayer preforms 50.

The first mold half 114 can be coupled to the fixed platen 102 by any suitable means, such as a suitable fastener (not depicted) or the like. The second mold half 116 can be coupled to the movable platen 104 by any suitable means, such as a suitable fastener (not depicted) or the like. It should be understood that in an alternative non-limiting embodiment of the present technology, the position of the first mold half 114 and the second mold half 116 can be reversed and, as such, the first mold half 114 can be associated with the movable platen 104 and the second mold half 116 can be associated with the fixed platen 102. In an alternative non-limiting embodiment of the present technology, the fixed platen 102 need not be stationary and may be movable in relation to other components of the injection molding machine 100.

FIG. 2 depicts the first mold half 114 and the second mold half 116 in a so-called "mold open position" where the movable platen 104 is positioned generally away from the fixed platen 102 and, accordingly, the first mold half 114 is positioned generally away from the second mold half 116. For example, in the mold open position, a molded article (not depicted) can be removed from the first mold half 114 and/or the second mold half 116. In a so-called "mold closed position" (not depicted), the first mold half 114 and the second mold half 116 are urged together (by means of movement of the movable platen 104 towards the fixed platen 102) and cooperate to define (at least in part) a molding cavity (not depicted) into which the molten plastic (or other suitable molding material) can be injected, as is known to those of skill in the art.

It should be appreciated that one of the first mold half 114 and the second mold half 116 can be associated with a number of additional mold elements, such as for example, one or more leader pins (not depicted) and one or more leader bushings (not depicted), the one or more leader pins cooperating with one more leader bushings to assist in alignment of the first mold half 114 with the second mold half 116 in the mold closed position, as is known to those of skill in the art.

The injection molding machine 100 can further comprise a robot 122 operatively coupled to the fixed platen 102. Those skilled in the art will readily appreciate how the robot 122 can be operatively coupled to the fixed platen 102 and, as such, it will not be described here in any detail. The robot 122 comprises a mounting structure 124, an actuating arm 126 coupled to the mounting structure 124 and a take-off plate 128 coupled to the actuating arm 126. The take-off plate 128 comprises a plurality of molded article receptacles 130.

Generally speaking, the purpose of the plurality of molded article receptacles 130 is to remove molded articles from the one or more mold cores 120 (or the one or more mold cavities 118) and/or to implement post mold cooling of the molded articles. In the non-limiting example illustrated herein, the plurality of molded article receptacles 130 comprises a plurality of cooling tubes for receiving a plurality of molded preforms. However, it should be expressly understood that the plurality of molded article receptacles 130 may have other configurations. The exact number of the plurality of molded article receptacles 130 is not particularly limited.

Schematically depicted in FIG. 2 is the robot 122 of a side-entry type. However, it should be understood that in alternative non-limiting embodiments of the present technology, the robot 122 can be of a top-entry type. It should also be expressly understood that the term "robot" is meant to encompass structures that perform a single operation, as well as structures that perform multiple operations.

The injection molding machine 100 further comprises a post-mold treatment device 132 operatively coupled to the movable platen 104. Those skilled in the art will readily appreciate how the post-mold treatment device 132 can be operatively coupled to the movable platen 104 and, as such, it will not be described here in any detail. The post-mold treatment device 132 comprises a mounting structure 134 used for coupling the post-mold treatment device 132 to the movable platen 104. The post-mold treatment device 132 further comprises a plenum 129 coupled to the mounting structure 134. Coupled to the plenum 129 is a plurality of treatment pins 133. The number of treatment pins within the plurality of treatment pins 133 generally corresponds to the number of receptacles within the plurality of molded article receptacles 130.

The injection molding machine 100 further comprises a computer-implemented apparatus 140, also referred to herein as a controller 140, configured to control one or more operations of the injection molding machine 100. The controller 140 includes a human-machine interface (not separately numbered) or an HMI, for short. The HMI of the controller 140 can be implemented in any suitable interface. As an example, the HMI of the controller 140 can be implemented in a multi-functional touch screen. An example of the HMI that can be used for implementing non-limiting embodiments of the present technology is disclosed in co-owned U.S. Pat. No. 6,684,264, content of which is incorporated herein by reference, in its entirety.

Those skilled in the art will appreciate that the controller 140 may be implemented using pre-programmed hardware or firmware elements (e.g., application specific integrated circuits (ASICs), electrically erasable programmable read-only memories (EEPROMs), etc.), or other related components. In other embodiments, the functionality of the controller 140 may be achieved using a processor that has access to a code memory (not shown) which stores computer-readable program code for operation of the computing apparatus, in which case the computer-readable program code could be stored on a medium which is fixed, tangible and readable directly by the various network entities, (e.g., removable diskette, CD-ROM, ROM, fixed disk, USB drive), or the computer-readable program code could be stored remotely but transmittable to the controller 140 via a modem or other interface device (e.g., a communications adapter) connected to a network (including, without limitation, the Internet) over a transmission medium, which may be either a non-wireless medium (e.g., optical or analog communications lines) or a wireless medium (e.g., microwave, infrared or other transmission schemes) or a combination thereof.

In alternative non-limiting embodiments of the present technology, the HMI does not have to be physically attached to the controller 140. As a matter of fact, the HMI for the controller 140 can be implemented as a separate device. In some embodiments, the HMI can be implemented as a wireless communication device (such as a smartphone, for example) that is "paired" or otherwise communicatively coupled to the controller 140.

The controller 140 can perform several functions including, but not limited to, receiving from an operator control instructions, controlling the injection molding machine 100 based on the operator control instructions or a pre-set control sequence stored within the controller 140 or elsewhere within the injection molding machine 100, acquire one or more operational parameters associated with the molding system and the like.

Various non-limiting embodiments of molded articles according to the present technology will be discussed with reference to FIGS. 3A to 11. It should be noted that in the prior art preform 50, the core layer 40 is continuous along the body portion of the preform 50 and circularly symmetric about the longitudinal axis, with similarly symmetric trailing and leading edges 42, 44. In contrast, embodiments of the molded articles, or preforms, of the present technology have core layers that have some selectively introduced asymmetry to influence blow-molding characteristics during subsequent blow-molding of the preforms, to create blow-molded articles with different structural features. Broadly speaking, embodiments of the present technology contemplate selecting a geometry of the core layer such that to affect a particular material behaviour during the processing of the preform (such as by stretch blow-molding and the like).

Figures 3A, 3B:
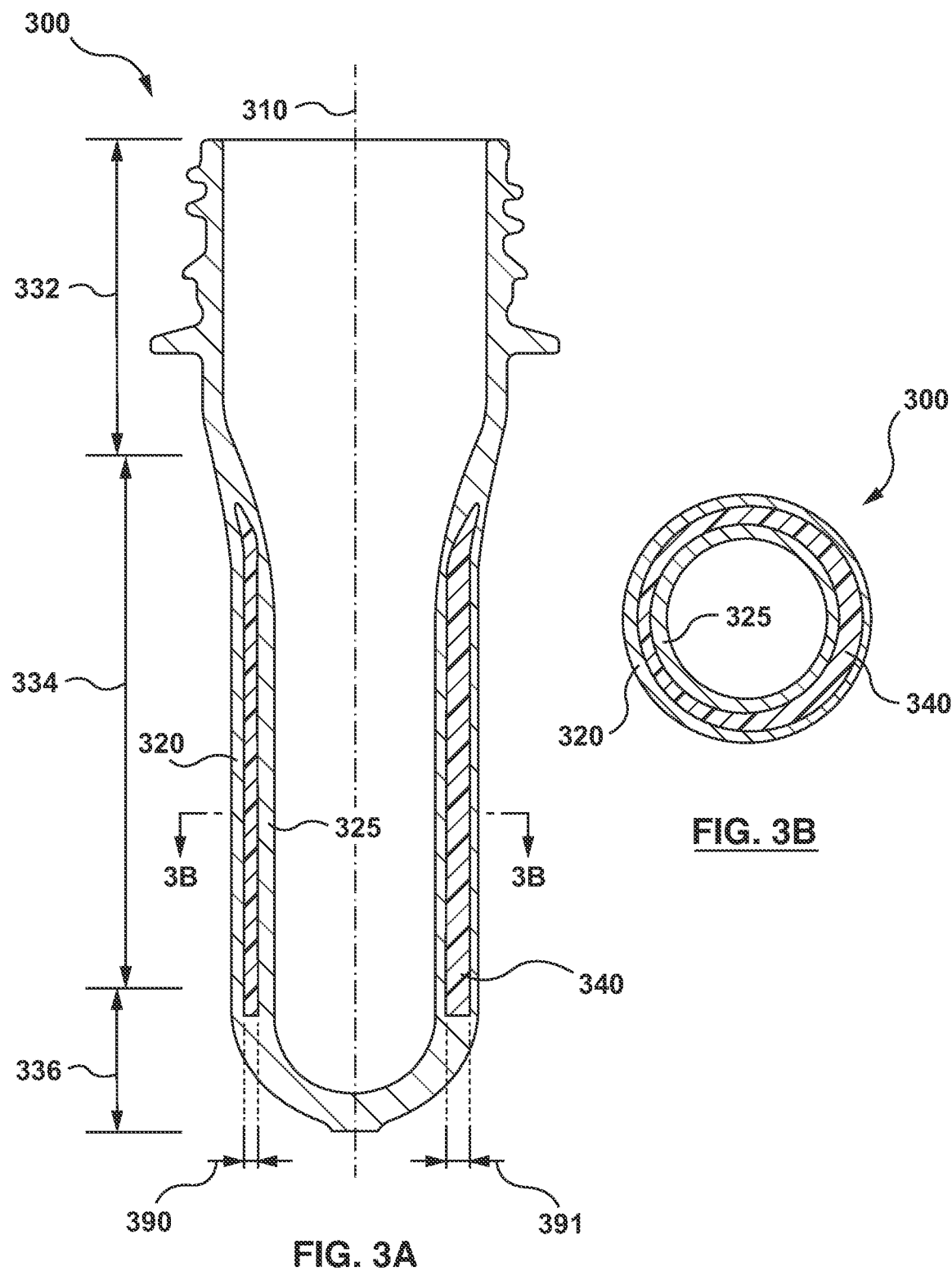
FIG. 3A is a longitudinal cross-sectional view of a multilayer preform according to one embodiment of the present technology.
FIG. 3B is a horizontal cross-sectional view of the multilayer preform of FIG. 3A, taken along line 3B-3B of FIG. 3A.

With reference to FIGS. 3A-3B, a molded article 300 according to one embodiment of the present technology will be described. The molded article 300, also referred to as a multilayer preform 300, is produced by the injection molding machine 100 described above. It is contemplated that the multilayer preform 300 could be produced by another type of molding machine in other non-limiting embodiments in accordance with the present technology.

The multilayer preform 300 consists of a neck portion 332, a gate portion 336 and a body portion 334 extending between the neck portion 332 and the gate portion 336. The body portion 334 of the multilayer preform 300 is formed by three layers. A majority of the body portion 334 has an overall shape that is symmetric about an axis 310 extending longitudinally through a center of the body portion 334, as can be seen in FIG. 3A.

On exterior sides, the body portion 334 has an outer exterior skin layer 320 and an inner exterior skin layer 325. The skin layers 320, 325 can be made of various materials, including any appropriate polymer resins and thermoplastics, as will be appreciated by those skilled in the art. The body portion 334 also has a core layer 340 disposed between at least a portion of the skin layers 320, 325. The core layer 340 is also composed of any appropriate polymer resin or thermoplastic, but is chosen to be a different material than the skin layers 320, 325.

As is illustrated in the FIGS. 3A-3B, at least a majority of the neck portion 332 is composed of the first polymeric material and is free of the second polymeric material. It is contemplated that in alternative non-limiting embodiments of the present technology, at least the majority of the neck portion 332 could be composed of the second polymeric material and be free of the first polymeric material in some implementations.

The preform 300 has a radial thickness of the core layer 340 that varies about the axis 310 to accomplish the goal of aiding in asymmetrical blow-molding and the final product created thereby (being an example of selectively controlling material behaviour during post-processing of the preform 300). It should be noted that the thickness of the skin layers 320, 325 varies about the axis 310, such that the overall shape of the body portion 334 remains generally symmetric. A radial thickness 390 (see FIG. 3A) at one point about the axis 310 is smaller than a radial thickness 391 at a point opposite the radial thickness 390. The radial thickness of the core layer 340, as can be seen in FIG. 3B, has a non-symmetrical annular form about the body axis 310.

Figure 12:
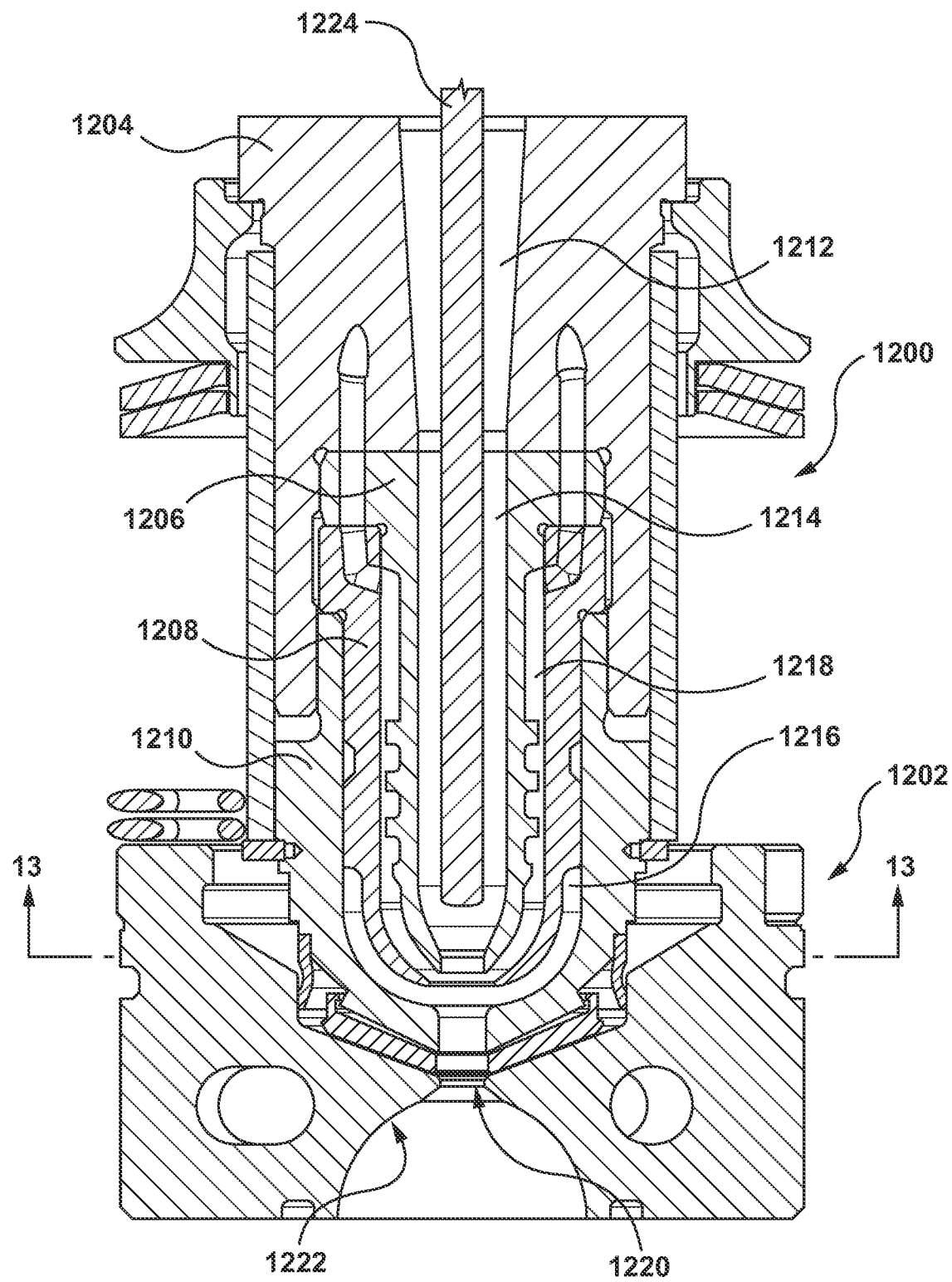
FIG. 12 is a cross section of a hot runner nozzle (the cross section being taken along an operational axis of the hot runner nozzle), the hot runner nozzle being suitable for implementing embodiments of the present technology.

The variance of the radial thickness of the core layer 340 about the axis 310 can be achieved by adapting a design of a hot runner nozzle that is used for producing the preform 300. With reference to FIG. 12, there is depicted a cross section of a hot runner nozzle 1200 that cooperates with a gate insert 1202 (the cross section being taken along an operational axis of the hot runner nozzle 1200 and the gate insert 1202).

The hot runner nozzle 1200 comprises a nozzle body 1204. The nozzle body 1204 comprises a first nozzle insert 1206, a second nozzle insert 1208 and a third nozzle insert 1210. Defined, at least partially, by the first nozzle insert 1206, the second nozzle insert 1208, and the third nozzle insert 1210 are nozzle flow channels for conveying molding materials.

More specifically, defined in the nozzle body 1204 is a first material main nozzle channel 1212 that receives a first material for forming the inner exterior skin layer 325 and the outer exterior skin layer 320.

The first material main nozzle channel 1212 branches off into: (i) a first material inner channel 1214 (defined in the first nozzle insert 1206) and (ii) a first material outer channel 1216 (defined by the second nozzle insert 1208 and the third nozzle insert 1210).

Both the first material inner channel 1214 and the first material outer channel 1216 convey the first material, which will eventually define the inner exterior skin layer 325 and the outer exterior skin layer 320, respectively.

Also defined between the first nozzle insert 1206 and the second nozzle insert 1208 is a second material nozzle channel 1218. The second material nozzle channel 1218 is configured to receive a second material that will define the core layer 340.

All of the first material inner channel 1214, the first material outer channel 1216, and the second material nozzle channel 1218 convey their respective molding materials (i.e. the first material and the second material) towards a gate area 1220, defined at an interface between the hot runner nozzle 1200 and the gate insert 1202, and eventually to a molding cavity 1222 of the mold.

The hot runner nozzle 1200 further comprises a valve stem 1224, the valve stem 1224 being configured for controlling the flow of the molding material into the gate area 1220 and the molding cavity 1222 of the mold.

More specifically, the valve stem 1224 is under control of the controller 140. The controller 140 causes the valve stem 1224 to reciprocate between a fully opened position as is depicted in FIG. 12 (in which all of the first material and the second material can be flowing towards the molding cavity 1222 through the gate area 1220 through the first material inner channel 1214, the first material outer channel 1216, and the second material nozzle channel 1218) to a fully closed position where the valve stem 1224 obstructs the gate area 1220, such that none of the first material and the second material is flowing towards the molding cavity 1222 through the gate area 1220 through any of the first material inner channel 1214, the first material outer channel 1216, and the second material nozzle channel 1218.

In some non-limiting embodiments of the present technology, the controller 140 can control the valve stem 1224 to one or more stop positions in-between the fully open and the fully closed positions of the valve stem 1224. In some of the embodiments of the present technology, by controlling the valve stem 1224 to one or more stop positions in-between the fully open and the fully closed positions of the valve stem 1224, the controller 140 can control the relative volumetric flow rates of the first material and the second material during various portions of the molding cycle.

Figure 13:
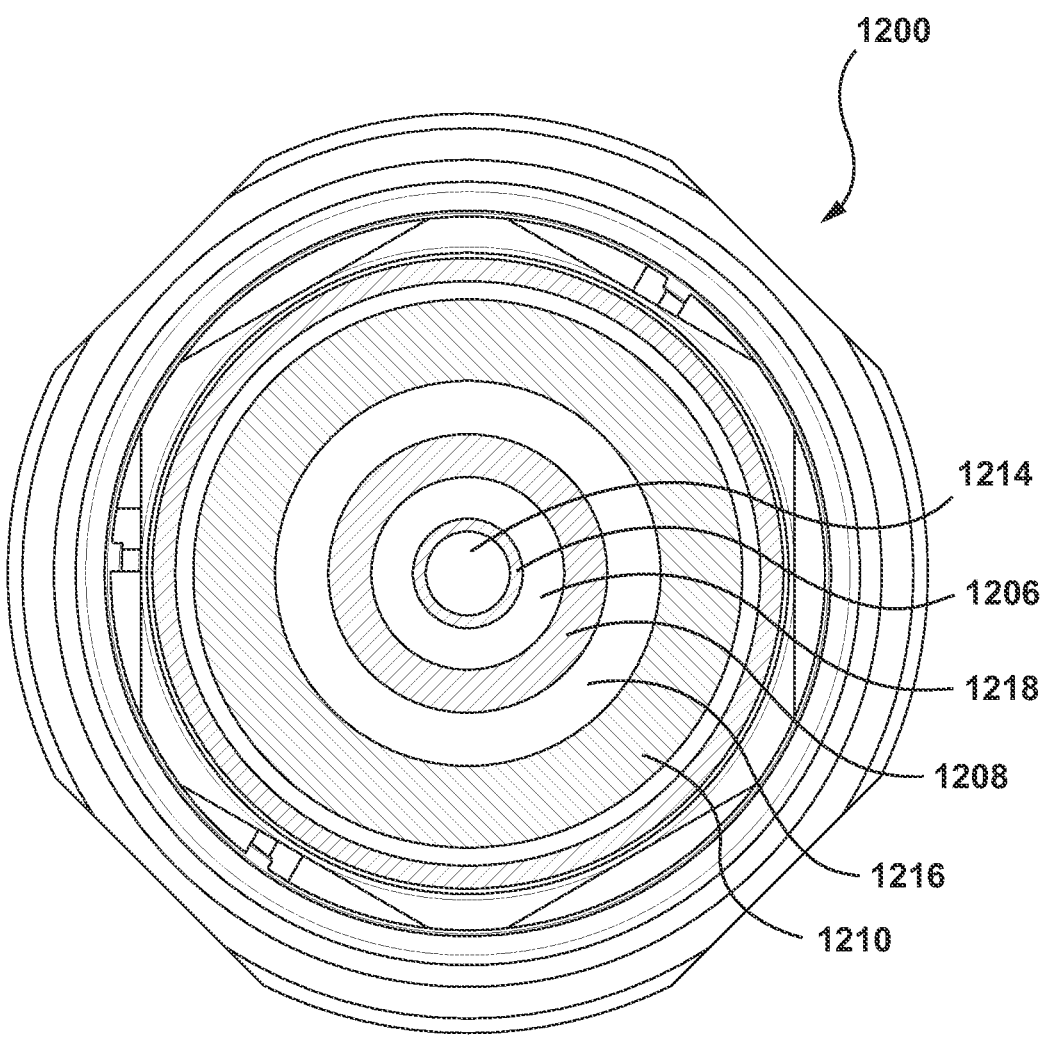
FIG. 13 is a cross section of the hot runner nozzle of FIG. 12 taken along line 13-13 of FIG. 12, the hot runner nozzle being configured for producing preforms with the radial thickness of the core layer that does not vary about the operational axis.

With reference to FIG. 13, there is depicted a cross section of the hot runner nozzle 1200 taken along lines 1300 of FIG. 12. The hot runner nozzle 1200 of FIG. 13 is configured for producing preforms with the radial thickness of the core layer 340 that does not vary about the axis 310.

Figure 14:
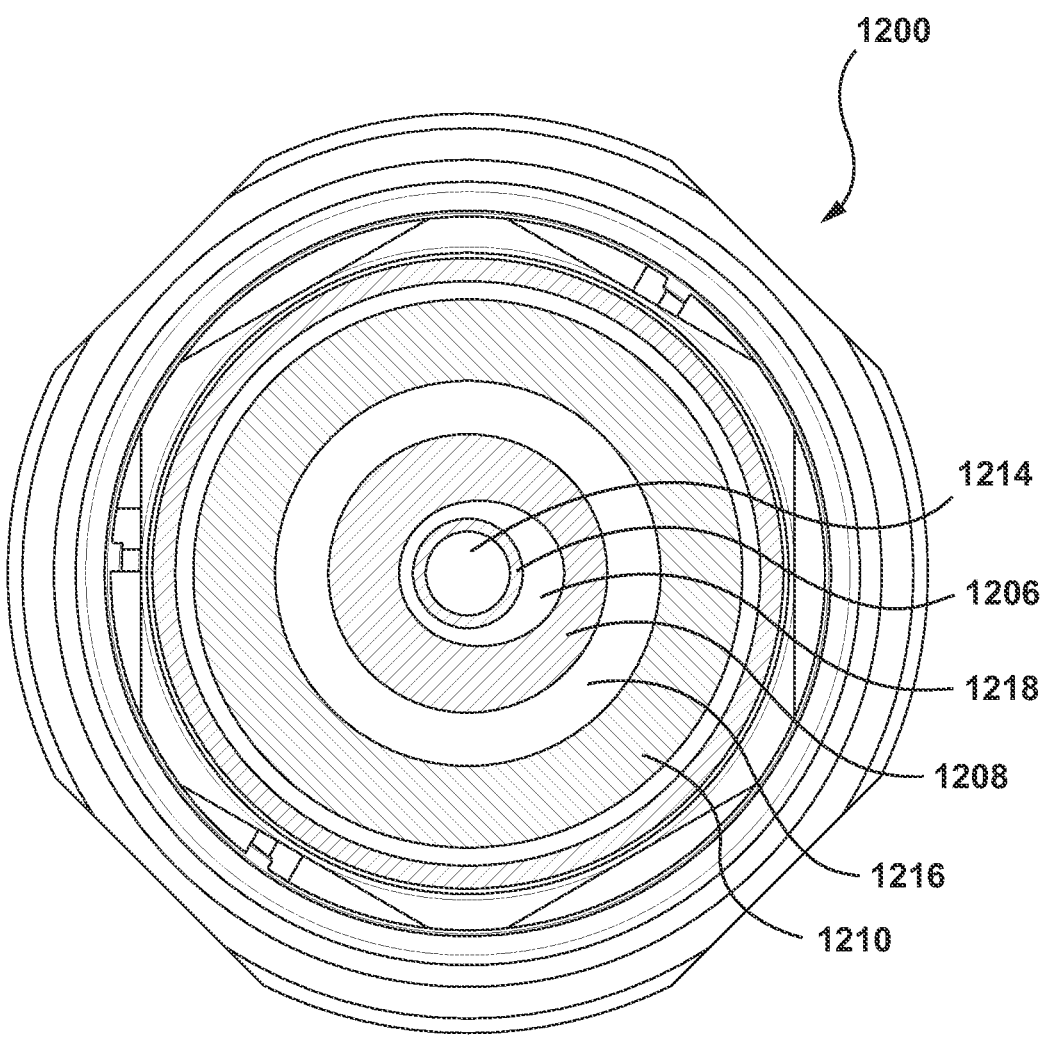
FIG. 14 is a cross section of the hot runner nozzle of FIG. 12 taken along line 13-13 of FIG. 12, the hot runner nozzle being configured for producing preforms with the radial thickness of the core layer that varies about the operational axis.

With reference to FIG. 14, there is depicted a modified version of the hot runner nozzle 1200, the modified version of the hot runner nozzle 1200 configured to produce the preforms with the radial thickness of the core layer 340 that varies about the axis 310. It is noted that in the FIG. 14 illustration, the shape of the first nozzle insert 1206 is adapted to produce a cross-section shape of the flow channel that is not symmetrical about the axis 310.

Specifically, the exterior surface of the first nozzle insert 1206 (partially defining the second material nozzle channel 1218) has an elliptical form, where the center of the elliptical form surface is off-center from a longitudinal axis of the hot runner nozzle 1200. It is contemplated that the surface of the first nozzle insert 1206 could have different forms.

Additionally or alternatively, the shape and/or the placement of the core layer 340 can be selectively controlled by positioning of the valve stem 1224. With reference to FIGS. 15A through to 15D, there is depicted a sequence of re-positioning of the valve stem 1224 to selectively undulate the core layer 340.

In the FIG. 15A illustration, the valve stem 1224 is depicted in the fully opened position, where all of the first material and the second material can be flowing towards the molding cavity 1222 through the gate area 1220 through the first material inner channel 1214, the first material outer channel 1216, and the second material nozzle channel 1218). It is noted that the actual flow of the first material and the second material is controlled by the controller 140 by commanding the associated injection unit 106.

Figure 15B:
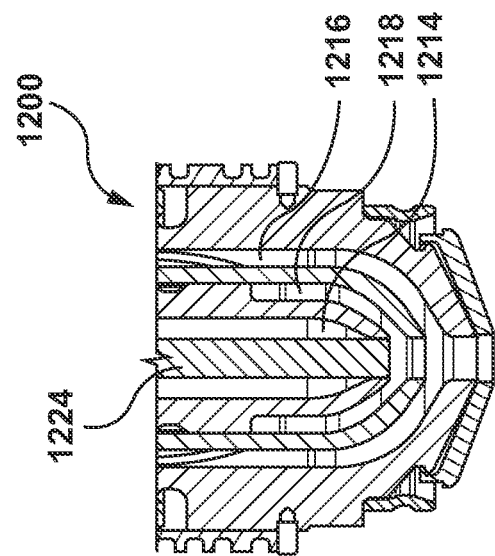
FIGS. 15A through to 15D depict a sequence of re-positioning of the valve stem to selectively undulate the core layer, the re-positioning of the valve stem being used for forming the shape of the core layer in some non-limiting embodiments of the present technology.
Figure 15A:
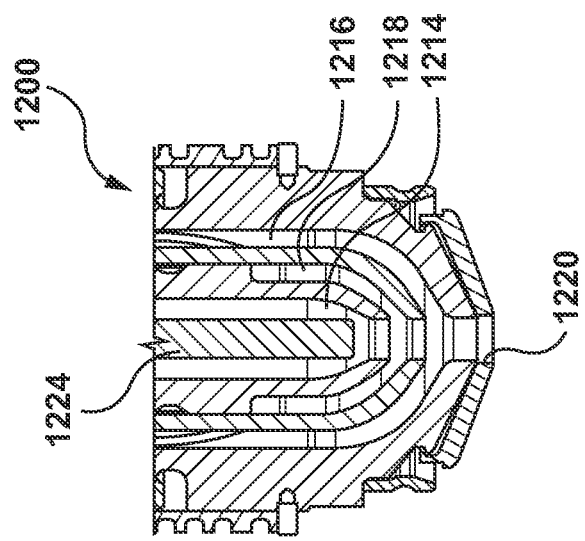

In the FIG. 15B illustration, the valve stem 1224 is depicted in a partially closed position, where the valve stem 1224 blocks the flow of the molding material through the first material inner channel 1214, while allowing full flow of the respective molding material through the second material nozzle channel 1218 and through the first material outer channel 1216. This positioning of the valve stem 1224 allows, for example, biasing the positioning of the core layer 340 towards the inner skin of the preform and/or control the thickness of the core layer 340.

Figure 15C:
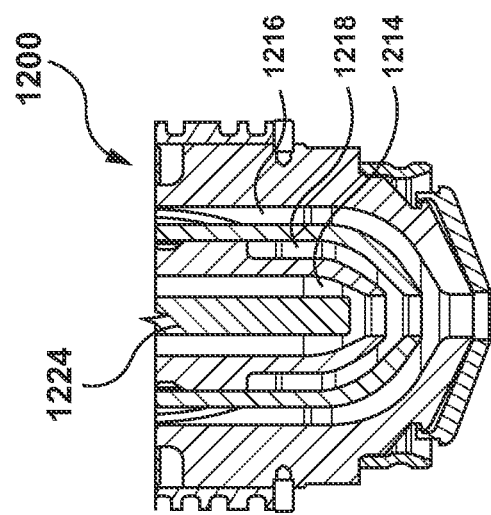

In the FIG. 15C illustration, the valve stem 1224 is depicted in another partially closed position, where the valve stem 1224 blocks the flow of the molding material through the first material inner channel 1214 and partially throttles the flow of molding material through the second material nozzle channel 1218, while allowing the molding material to flow through the first material outer channel 1216. This positioning of the valve stem 1224 allows, for example, further biasing the positioning of the core layer 340 towards the inner skin of the preform and/or control the thickness of the core layer 340.

Figure 15D:
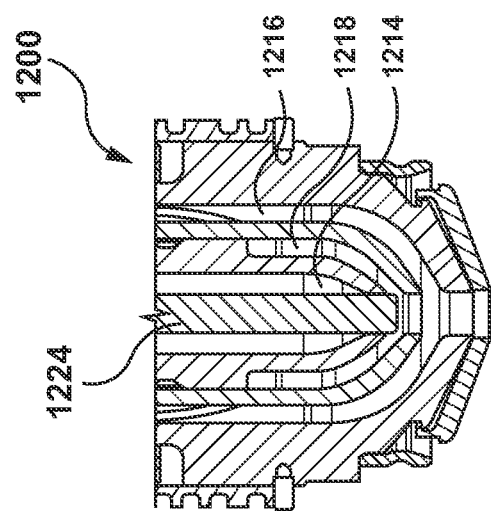
Figure 16D:
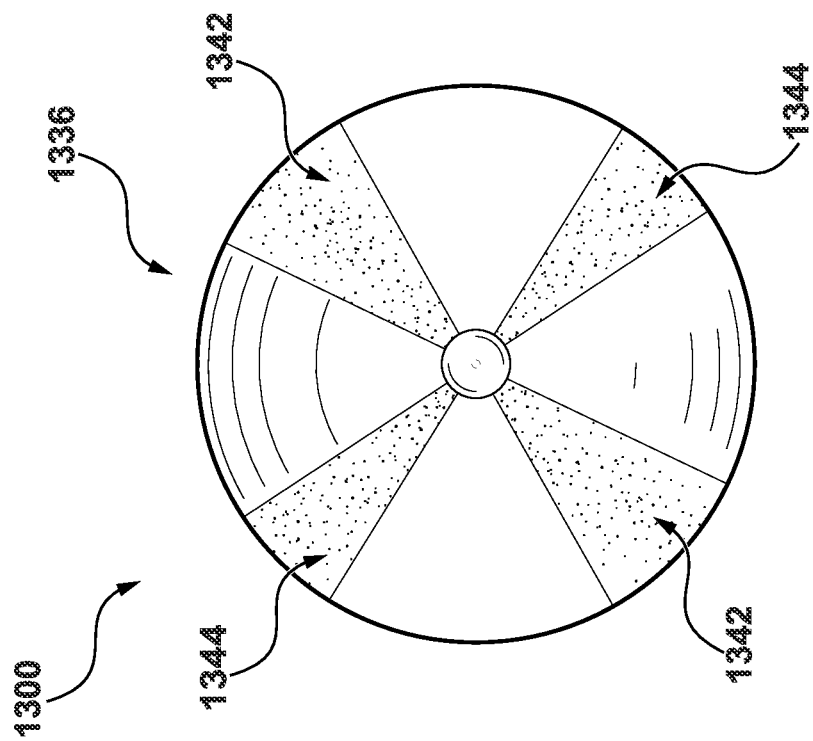
FIG. 16D is a line drawing representation of the photograph of FIG. 16C.
Figure 16C:
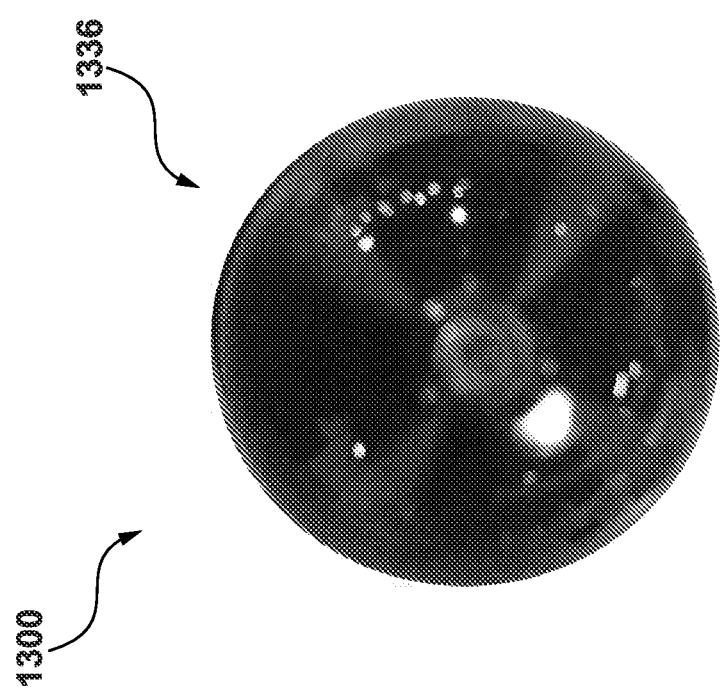
FIG. 16C is a bottom plan view photograph of the molded article of FIG. 16A.

In the FIG. 15D illustration, the valve stem 1224 is depicted again in the fully opened position, where all of the first material and the second material can be flowing towards the molding cavity 1222 through the gate area 1220 through the first material inner channel 1214, the first material outer channel 1216, and the second material nozzle channel 1218). This positioning of the valve stem 1224 allows, for example, re-positioning of the core layer 340 towards the middle of the preform and/or control the thickness of the core layer 340.

In some embodiments, the first and second materials are chosen such that a rate of thermal crystallization of the first polymeric material is substantially less than that of the second polymeric material. In some other embodiments, the second polymeric material has a substantially higher intrinsic viscosity than the first polymeric material. Such embodiments will be discussed in more detail below with reference to FIGS. 10 and 11.

In either of such embodiments, the different blow-molding characteristics of the two different materials of the skin layers 320, 325 and the core layer 340, combined with the non-uniformity of the core layer thickness, allows blow molding of the preform 300 in a selectively varied way. For example, the portion of the preform 300 where the radial thickness 391 is comparatively larger, can travel a comparatively larger path during stretch blow-molding process.

Figures 4A, 4B:
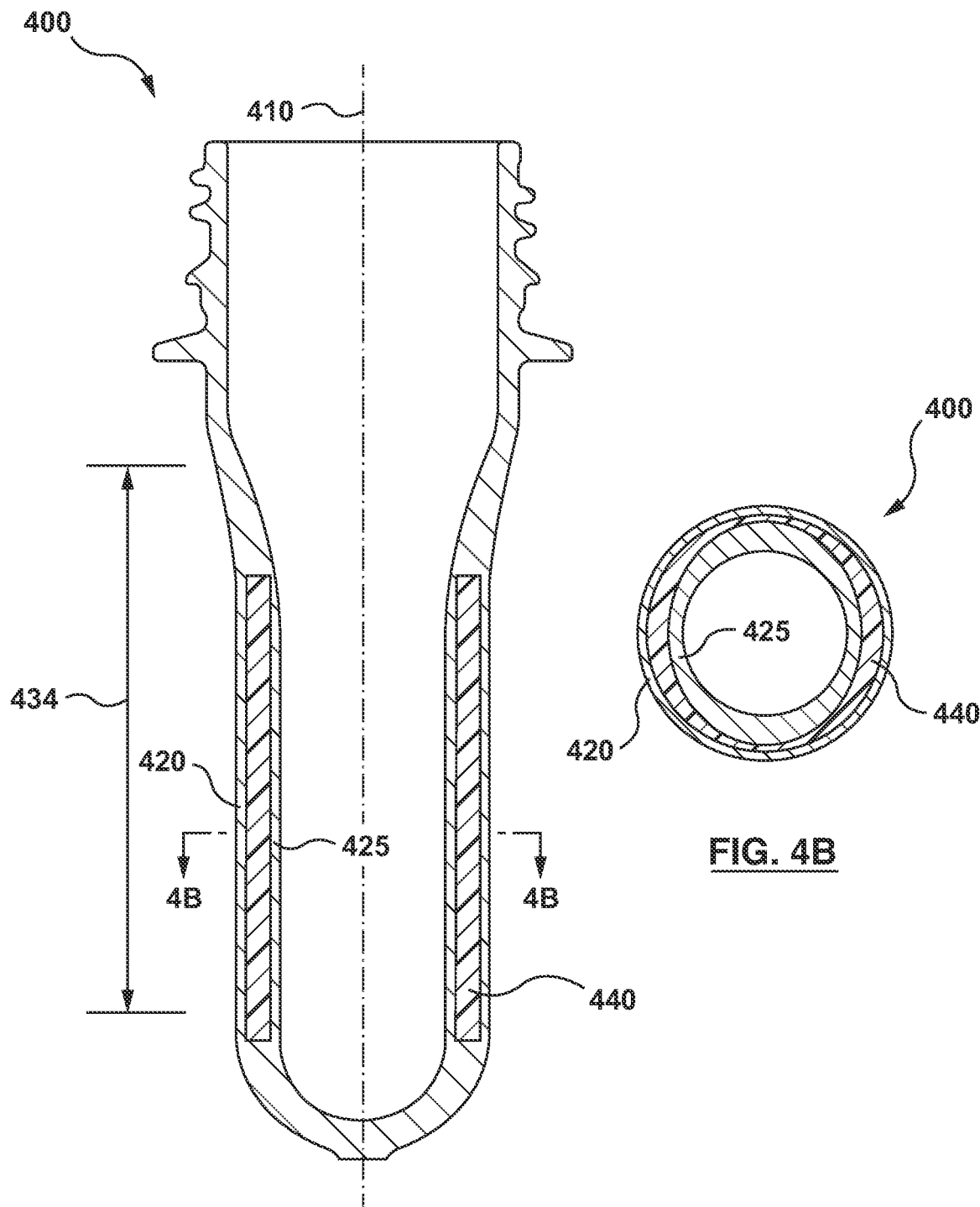
FIG. 4A is a longitudinal cross-sectional view of a multilayer preform according to another embodiment of the present technology.
FIG. 4B is a horizontal cross-sectional view of the multilayer preform of FIG. 4A, taken along line 4B-4B of FIG. 4A.

With reference to FIGS. 4A-4B, a multilayer preform 400 according to another non-limiting embodiment of the present technology will be described. The multilayer preform 400 is produced by the injection molding machine 100 described above. It is contemplated that the multilayer preform 400 could be produced by another type of molding machine in other non-limiting embodiments in accordance with the present technology.

The multilayer preform 400 includes a body portion 434 that is formed by three layers; remaining portions of the preform 400 are substantially similar to the preform 300 described above and as such need not be repeated here.

On exterior sides, the body portion 434 has an outer exterior skin layer 420 and an inner exterior skin layer 425. The skin layers 420, 425 can be made of various materials, including any appropriate polymer resins and thermoplastics, as will be appreciated by those skilled in the art. The body portion 434 also includes a core layer 440 disposed between the skin layers 420, 425. The core layer 440 is also composed of any appropriate polymer resin or thermoplastic, but is chosen to be a different material than the skin layers 420, 425.

As can be seen in the Figures, a radial thickness of the core layer 440 varies about a body axis 410. It should be noted that the thickness of the skin layers 420, 425 also vary about the body axis 410, such that the overall shape of the body portion 434 remains generally rotationally symmetric. In this illustrated embodiment, while the radial thickness of the core layer 440 varies about the axis 410, the core layer 440 has a symmetrical annular form about the body axis 410, as can be seen in FIG. 4B.

Controlling of the shape and/or placement of the core layer 440 can be implemented similarly to that of the core layer 340—by either of the design of the hot runner nozzle and/or controlling the valve stem 1224 of the hot runner nozzle.

The variance of the radial thickness of the core layer 440 about the axis 410 can be achieved by adapting a design of a hot runner nozzle that is used for producing the preform 400. One non-limiting embodiment of such a hot runner nozzle design including an intermediate nozzle insert 1608 is described in more detail below with respect to FIGS. 24 and 25.

Figures 5A, 5B:
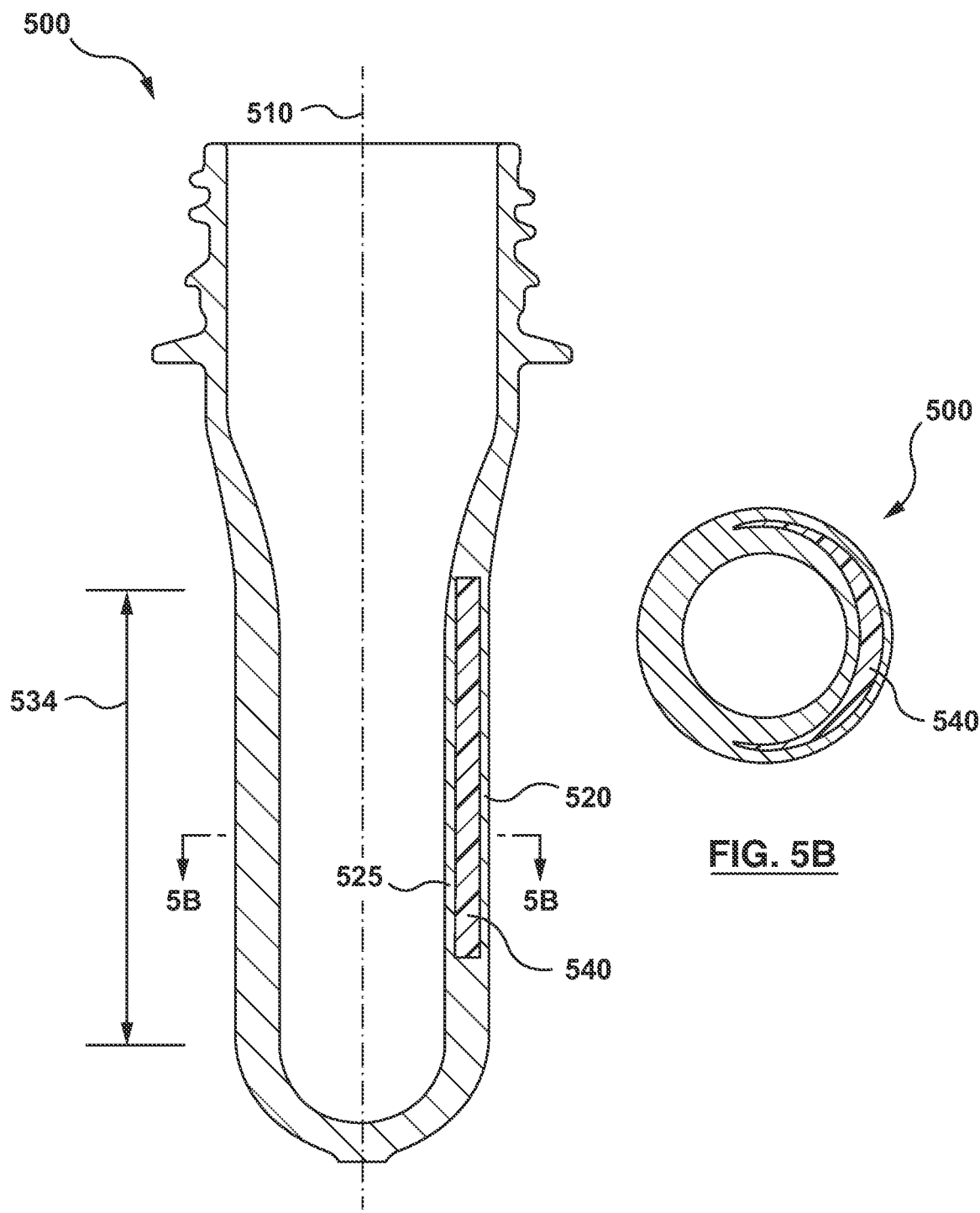
FIG. 5A is a longitudinal cross-sectional view of a multilayer preform according to yet another embodiment of the present technology.
FIG. 5B is a horizontal cross-sectional view of the multilayer preform of FIG. 5A, taken along line 5B-5B of FIG. 5A.

With reference to FIGS. 5A-5B, a multilayer preform 500 according to another non-limiting embodiment of the present technology will be described. The multilayer preform 500 is produced by the injection molding machine 100 described above. It is contemplated that the multilayer preform 500 could be produced by another type of molding machine in other non-limiting embodiments in accordance with the present technology.

The multilayer preform 500 includes a body portion 534 that is formed by three layers; remaining portions of the preform 500 are substantially similar to the preform 300 described above and as such need not be repeated here.

As with the preform 300, the body portion 534 has an outer exterior skin layer 520 and an inner exterior skin layer 525, both skin layers 520, 525 being made of the first material. The body portion 534 also has a core layer 540 composed of a second material, chosen from a different material than the skin layers 520, 525. In this embodiment, the core layer 540 is a semi-annular core layer, where the radial thickness of the core layer 540 varies about a body axis 510. The skin layers 520, 525 are in contact for a portion of the body portion 534, where the radial thickness of the core layer 540 goes to zero.

Controlling of the shape and/or placement of the core layer 540 can be implemented similarly to that of the core layer 340—by either of the design of the hot runner nozzle and/or controlling the valve stem 1224 of the hot runner nozzle.

The variance of the radial thickness of the core layer 540 about the axis 510 can be achieved by adapting a design of a hot runner nozzle that is used for producing the preform 500. One non-limiting embodiment of such a nozzle design for a hot runner 1900 is described in more detail below with respect to FIGS. 28-31.

With reference to FIGS. 6A-6C, a multilayer preform 600 according to another non-limiting embodiment of the present technology will be described. The multilayer preform 600 is produced by the injection molding machine 100 described above. It is contemplated that the multilayer preform 600 could be produced by another type of molding machine in other non-limiting embodiments in accordance with the present technology.

The multilayer preform 600 includes a body portion 634 that is formed by three layers; remaining portions of the preform 600 are substantially similar to the preform 300 described above and as such need not be repeated here.

The body portion 634 of the preform 600 includes a transition portion 635 extending between a neck portion 632 and the body portion 634. The transition portion 635 includes a transition inner layer 625 and a transition outer layer 620 of the first polymeric material. The transition portion 635 also includes a transition core layer 640 of the second polymeric material disposed between at least a portion of the layers 620, 625. In the illustrated embodiment, the second polymeric material is stiffer, such that a thicker portion of the core layer 640 expands less than a thinner portion of the core layer 640 during a same blow-molding process.

Broadly speaking the non-limiting embodiment of the preform 600 contemplates placing the second polymeric material only in the transition portion 635. A small portion of the core layer of the body portion of the preform 600 is circumferentially varying as well, as is described in other non-limiting embodiments herein.

An example of a blow-molded product 601 made from the preform 600 is illustrated in FIG. 6C. A transition portion 675 of the product 601 has portions that expanded less during blow-molding where the core layer 640 is thicker and expanded more where the core layer 640 is thinner.

Controlling of the shape and/or placement of the core layer 640 can be implemented similarly to that of the core layer 340—by either of the design of the hot runner nozzle and/or controlling the valve stem 1224 of the hot runner nozzle.

Figures 7A, 7B:
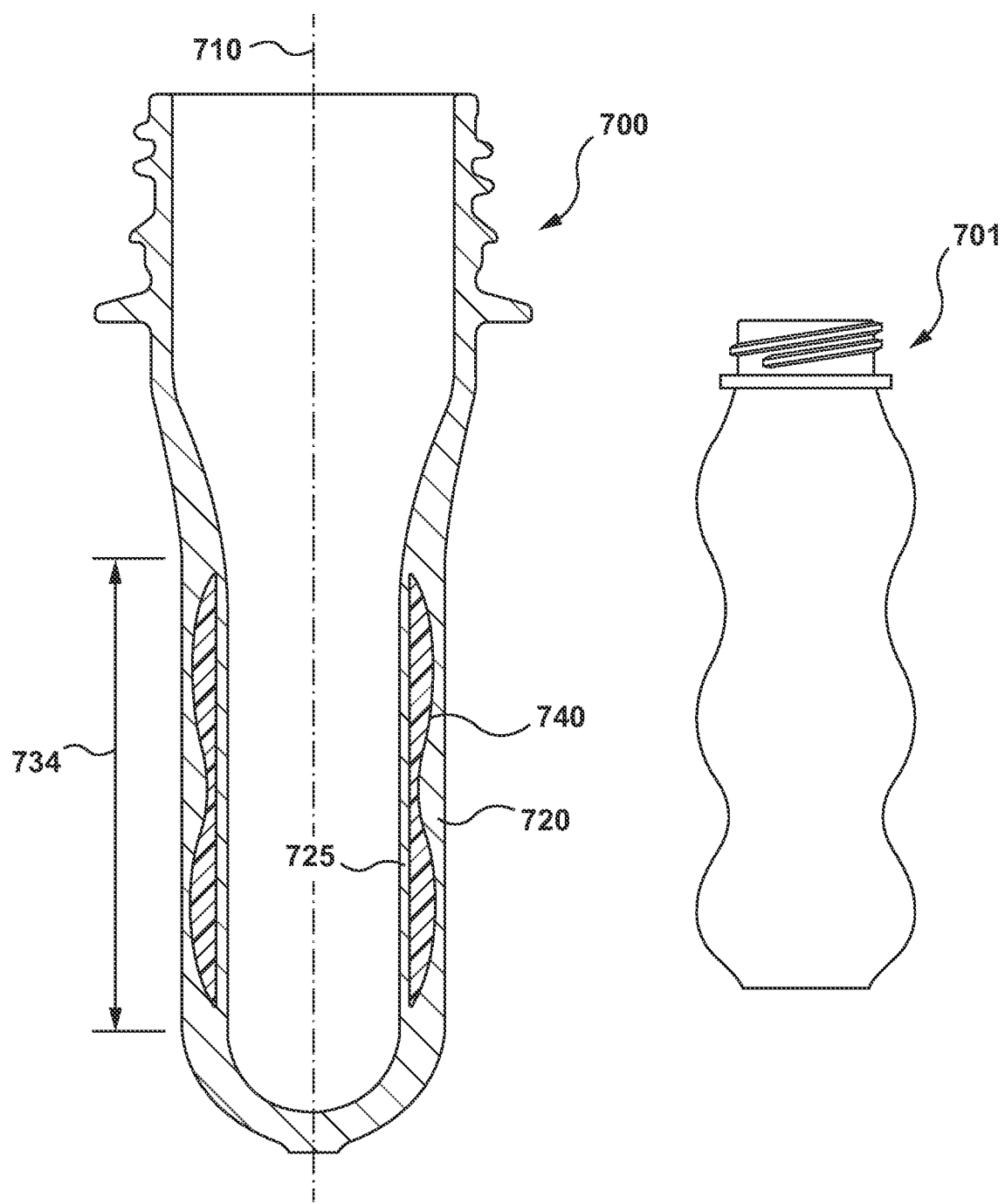
FIG. 7A is a longitudinal cross-sectional view of a multilayer preform according to yet another embodiment of the present technology.
FIG. 7B is a front side elevation view of a blow-molded product blown from the preform of FIG. 7A.

With reference to FIGS. 7A-7B, a multilayer preform 700 according to another non-limiting embodiment of the present technology will be described. The multilayer preform 700 is produced by the injection molding machine 100 described above. It is contemplated that the multilayer preform 700 could be produced by another type of molding machine in other non-limiting embodiments in accordance with the present technology.

The multilayer preform 700 includes a body portion 734 is formed by three layers; remaining portions of the preform 700 are substantially similar to the preform 300 described above and as such need not be repeated here.

As with the preform 300, the body portion 734 has an outer exterior skin layer 720 and an inner exterior skin layer 725, both skin layers 720, 725 being made of the first material. The body portion 734 also has a core layer 740 composed of a second material, chosen from a different material than the skin layers 720, 725.

In this embodiment, the radial thickness of the core layer 740 is generally uniform about a body axis 710. The radial thickness of the core layer 740 of the preform 700 instead varies along an axial direction defined by the axis 710. An example of a blow-molded product 701 made from the preform 700 is illustrated in FIG. 7B. As with the preform 600, thicker portions of the core material expands less during blow-molding than the thinner portion. The thicker portions of the core layer 740 thus cause tighter portions on the blow-molded product 701.

Controlling of the shape and/or placement of the core layer 740 can be implemented similarly to that of the core layer 340—by either of the design of the hot runner nozzle and/or controlling the valve stem 1224 of the hot runner nozzle.

Figure 8C:
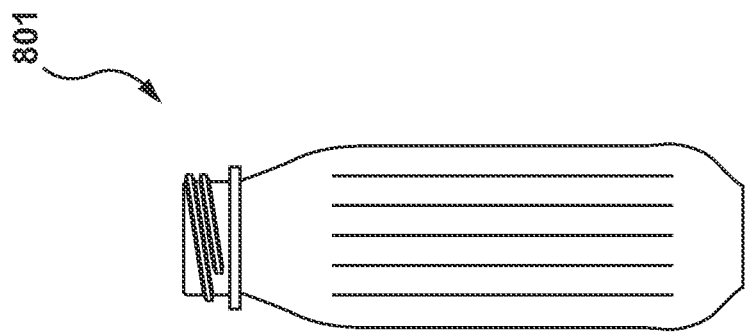
FIG. 8C is a front side elevation view of a blow-molded product blown from the preform of FIG. 8A.
Figure 8B:
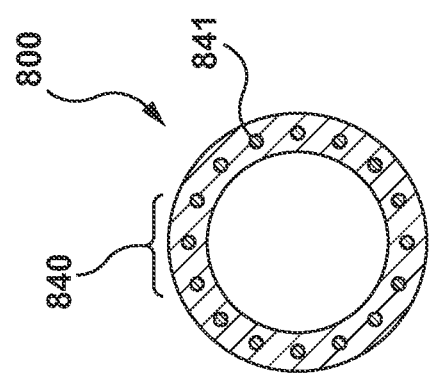
FIG. 8B is a horizontal cross-sectional view of the multilayer preform of FIG. 8A, taken along line 8B-8B of FIG. 8A.
Figure 8A:
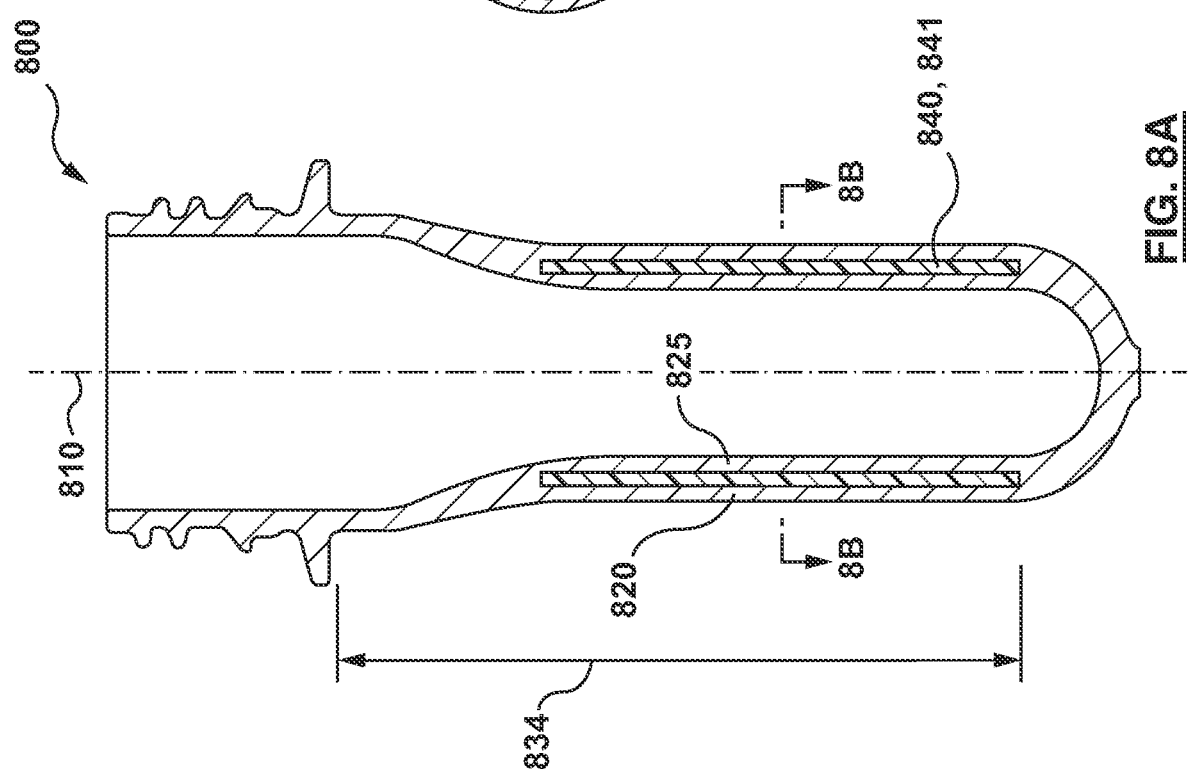
FIG. 8A is a longitudinal cross-sectional view of a multilayer preform according to yet another embodiment of the present technology.

With reference to FIGS. 8A-8C, a multilayer preform 800 according to another non-limiting embodiment of the present technology will be described. The multilayer preform 800 is produced by the injection molding machine 100 described above. It is contemplated that the multilayer preform 800 could be produced by another type of molding machine in other non-limiting embodiments in accordance with the present technology.

The multilayer preform 800 includes a body portion 834 is formed by three layers; remaining portions of the preform 800 are substantially similar to the preform 300 described above and as such need not be repeated here.

As with the preform 300, the body portion 834 has an outer exterior skin layer 820 and an inner exterior skin layer 825, both skin layers 820, 825 being made of the first polymeric material. The body portion 834 also has a core layer 840 composed of a second material, chosen from a different material than the skin layers 820, 825.

The core layer 840 is an interrupted layer 840. The interrupted layer 840 is made up of a plurality of core portions 841; the layers 820, 825 are in contact at places where the radial thickness of the core layer 840 decreases to zero (between the core portions 841).

A blow-molded product 801 made from the preform 800 is illustrated in FIG. 8C. The core portions 841 form ribbing on the blow-molded product 801.

Controlling of the shape and/or placement of the interrupted core layer 840 can be implemented similarly to that of the core layer 340—by either of the design of the hot runner nozzle (by adding structure that creates the interrupted shape of the interrupted core layer 840) and/or controlling the valve stem 1224 of the hot runner nozzle.

Figure 9C:
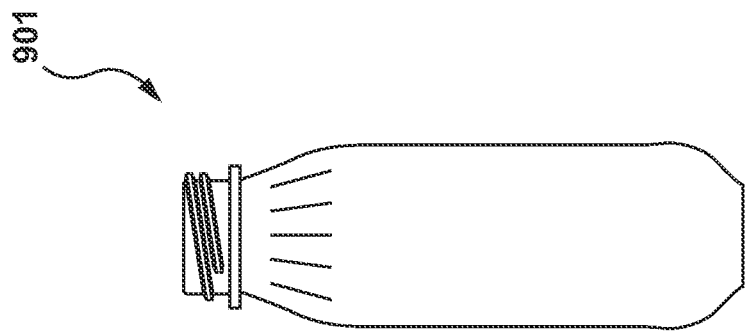
FIG. 9C is a front side elevation view of a blow-molded product blown from the preform of FIG. 9A.
Figure 9B:
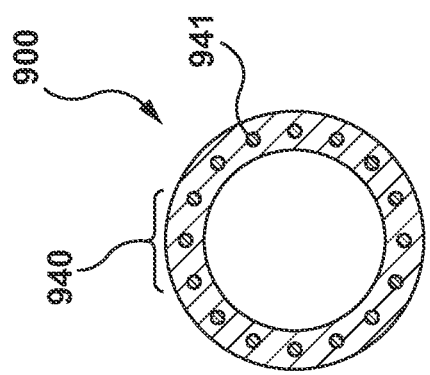
FIG. 9B is a horizontal cross-sectional view of the multilayer preform of FIG. 9A, taken along line 9B-9B of FIG. 9A.
Figure 9A:
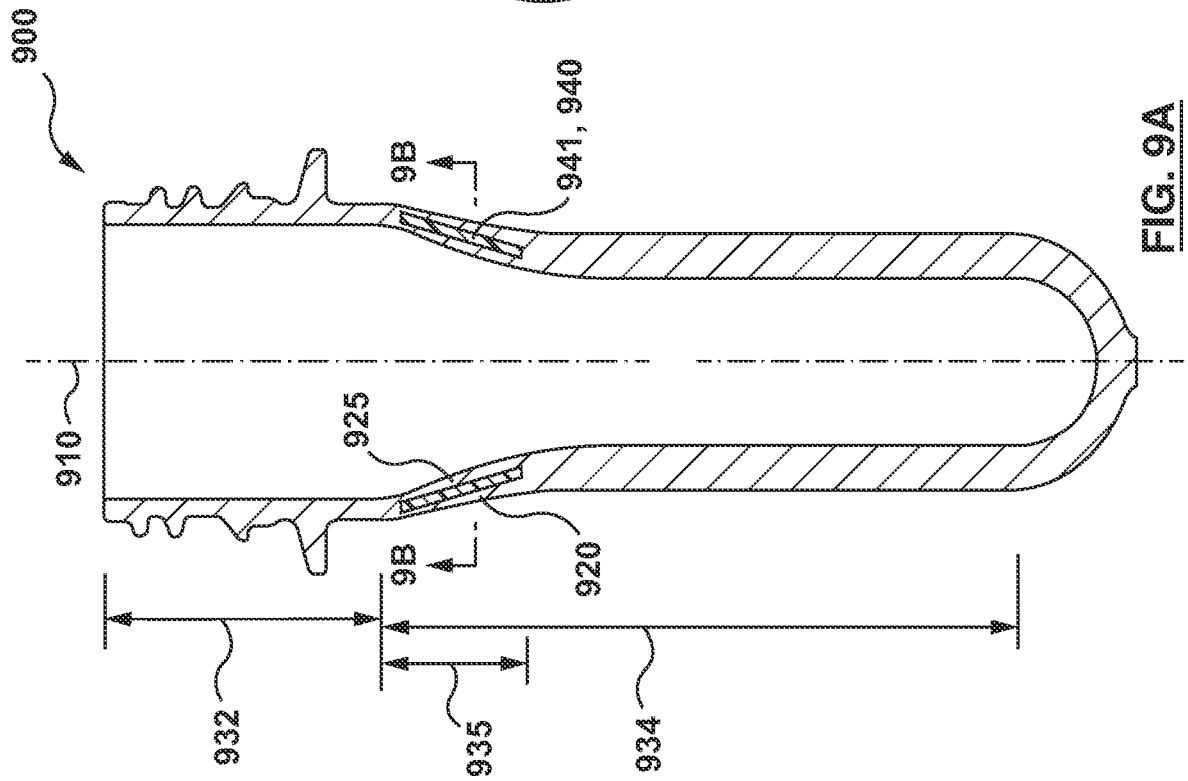
FIG. 9A is a longitudinal cross-sectional view of a multilayer preform according to yet another embodiment of the present technology.

With reference to FIGS. 9A-9C, a multilayer preform 900 according to another non-limiting embodiment of the present technology will be described. The multilayer preform 900 is produced by the injection molding machine 100 described above. It is contemplated that the multilayer preform 900 could be produced by another type of molding machine in other non-limiting embodiments in accordance with the present technology.

The multilayer preform 900 includes a body portion 934 is formed by three layers; remaining portions of the preform 900 are substantially similar to the preform 300 described above and as such need not be repeated here.

The body portion 934 of the preform 900 includes a transition portion 935 extending between a neck portion 932 and the body portion 934. The transition portion 935 includes a transition inner layer 925 and a transition outer layer 920 of the first polymeric material. The transition portion 935 also includes a transition core layer 940 of the second polymeric material disposed between at least a portion of the layers 920, 925. The core layer 940 is an interrupted layer 940. The interrupted layer 940 is made up of a plurality of core portions 941; the layers 920, 925 are in contact at places where the radial thickness of the transition core layer 940 decreases to zero (between the core portions 941).

A blow-molded product 901 made from the preform 900 is illustrated in FIG. 9C. The core portions 941 form ribbing on the blow-molded product 901, similar to the blow-molded product 801.

Controlling of the shape and/or placement of the interrupted core layer 940 can be implemented similarly to that of the core layer 340—by either of the design of the hot runner nozzle (by adding structure that creates the interrupted shape of the interrupted core layer 940) and/or controlling the valve stem 1224 of the hot runner nozzle.

Figure 10:
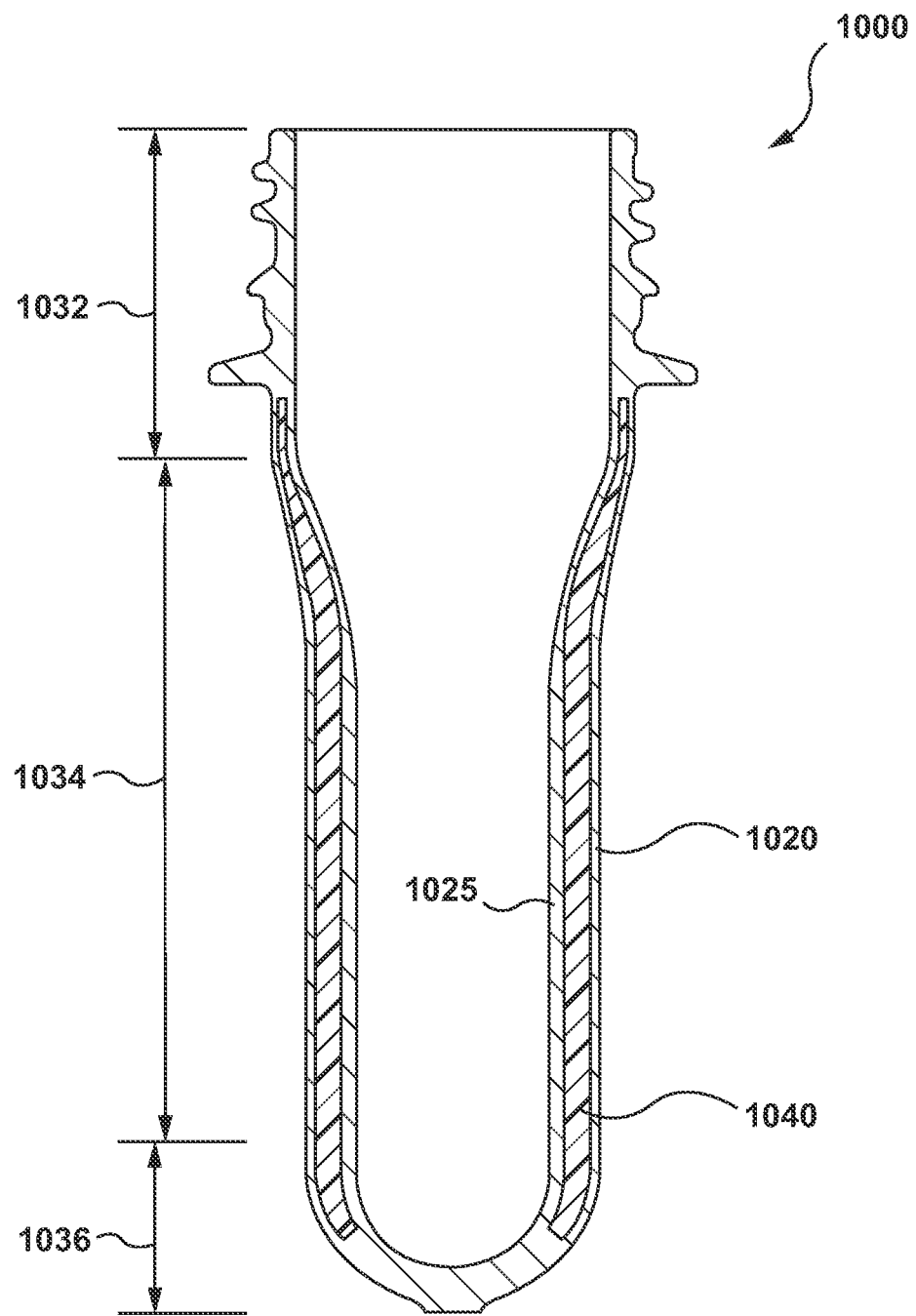
FIG. 10 is a longitudinal cross-sectional view of a multilayer preform according to yet another embodiment of the present technology.

With reference to FIG. 10, a molded article 1000 according to another non-limiting embodiment of the present technology will be described. The molded article 1000, also referred to as a multilayer preform 1000, is produced by the injection molding machine 100 described above. It is contemplated that the multilayer preform 1000 could be produced by another type of molding machine in other non-limiting embodiments in accordance with the present technology.

The preform 1000 includes a neck portion 1032, a body portion 1034, and a gate portion 1036 as described with respect to preform 50. The body portion 1034 includes skin layers 1020 and 1025, and a core layer 1040. While the core layer 1040 is illustrated as the rotationally symmetric core form of the preform 50, it is contemplated that the core layer 1040 could be implemented in the form of any of FIGS. 3A-9A.

The inner exterior layer 1020 and the outer exterior layer 1025 are both formed from a first polymeric material, which is a non-strain hardening material. The material of the skin layers 1020, 1025 could be chosen from, but it not limited to, high-density polyethylene (HDPE) and polypropylene (PP).

The core layer 1040 is formed from a second, different polymeric material. In this embodiment, the first and second materials are chosen such that a rate of thermal crystallization of the first polymeric material is substantially less than that of the second polymeric material. Specifically, the core layer 1020 is made of a strain-hardening material, which could include, but is not limited to, a strain-crystallizable homopolymer, copolymer, and blend of polyethylene terephthalate (PET). By including a strain-hardening material as the core layer 1040, the preform 1000 can utilize non-strain-hardening materials, which may have preferable aesthetic and cost properties, while the strain-hardening core layer 1040 provides strength lacking in the skin layers 1020, 1025.

In this non-limiting embodiment, the neck portion 1032 is also made of the non-strain hardening material, although in some non-limiting embodiments it is contemplated that the neck portion 1032 could be made from the same material as the core layer 1040, or even a third, different material.

Controlling of the shape and/or placement of the core layer 1040 can be implemented similarly to that of the core layer 340—by either of the design of the hot runner nozzle and/or controlling the valve stem 1224 of the hot runner nozzle.

Figure 11:
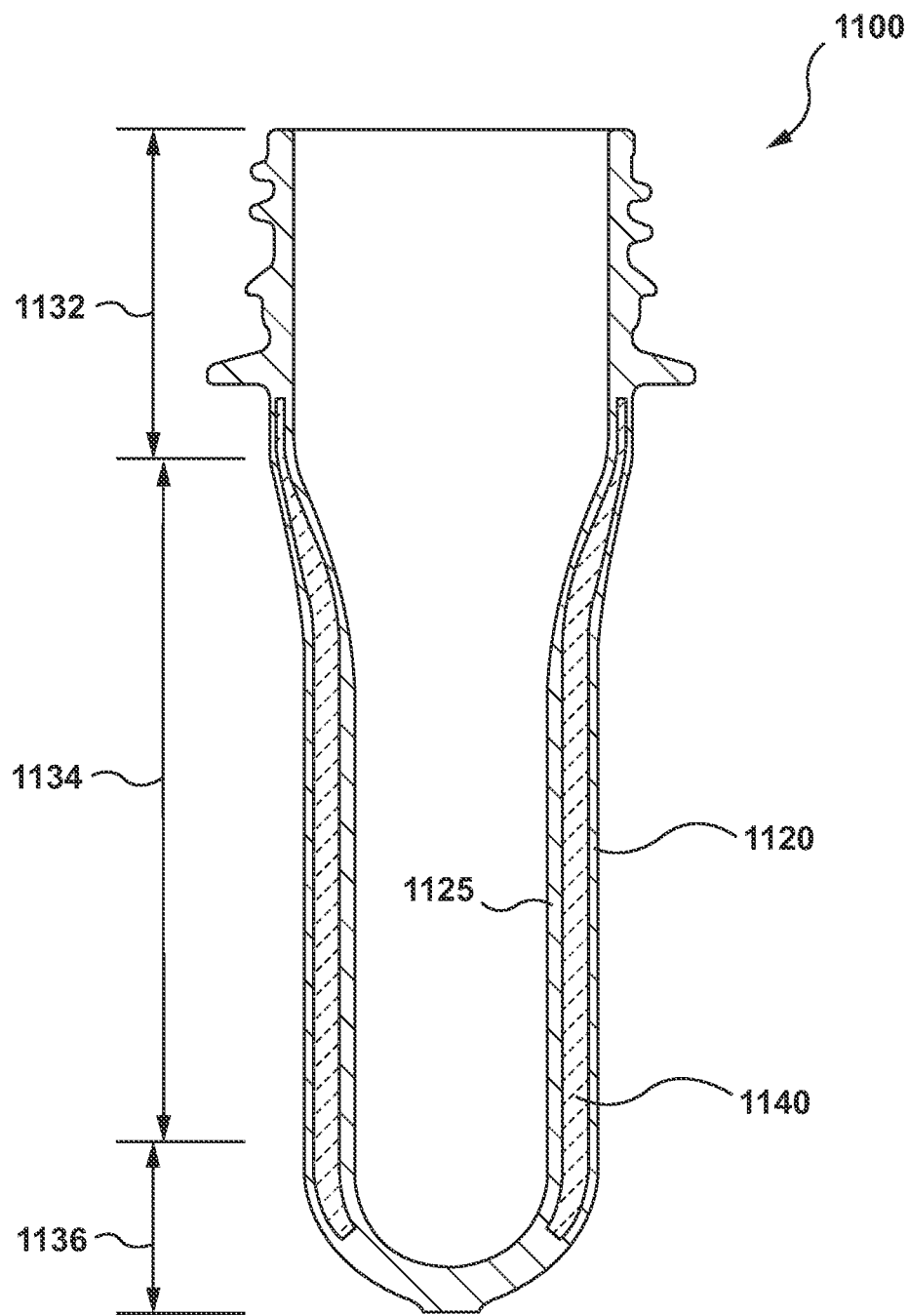
FIG. 11 is a longitudinal cross-sectional view of a multilayer preform according to yet another embodiment of the present technology.

With reference to FIG. 11, a molded article 1100 according to another non-limiting embodiment of the present technology will be described. The multilayer preform 1100 is produced by the injection molding machine 100 described above. It is contemplated that the multilayer preform 1100 could be produced by another type of molding machine in other non-limiting embodiments in accordance with the present technology.

The preform 1100 includes a neck portion 1132, a body portion 1134, and a gate portion 1136 as described with respect to preform 50. The body portion 1134 includes skin layers 1120 and 1125, and a core layer 1140. While the core layer 1140 is illustrated as the rotationally symmetric core form of the preform 50, it is contemplated that the core layer 1140 could be implemented in the form of any of FIGS. 3A-9A.

The inner exterior layer 1120 and the outer exterior layer 1125 are both formed from a first polymeric material. The core layer 1140 is formed from a second, different polymeric material. In this embodiment, the first and second materials are chosen such that the second polymeric material has a substantially higher intrinsic viscosity then the first polymeric material. In some non-limiting embodiments, the first polymeric material can be PET and the second polymeric material can be chosen from, but is not limited to, PP, polyethylene (PE), HDPE, and Nylon.

In this non-limiting embodiment, the neck portion 1132 is made from the lower viscosity material, although in some non-limiting embodiments it is contemplated that the neck portion 1032 could be made from the same material as the core layer 1140, or even a third, different material.

Controlling of the shape and/or placement of the core layer 1140 can be implemented similarly to that of the core layer 340—by either of the design of the hot runner nozzle and/or controlling the valve stem 1224 of the hot runner nozzle.

With reference to FIGS. 16A-16D, a molded article 1300 according to yet another non-limiting embodiment of the present technology will be described. The molded article 1300, specifically a multilayer preform 1300, is produced by the injection molding machine 100 described above, using a hot runner nozzle 1400 illustrated in FIGS. 17-18 (described in more detail below). It is contemplated that the multilayer preform 1300 could be produced by another type of molding machine in other non-limiting embodiments in accordance with the present technology.

The preform 1300 includes a neck portion (not shown), a body portion 1334, and a gate portion 1336 as described with respect to preform 50. The body portion 1334 includes skin layers 1320 and 1325, and a core layer 1340. The inner exterior layer 1320 and the outer exterior layer 1325 are both formed from a first polymeric material, also referred to as the skin layer material. The material of the skin layers 1320, 1325 could be chosen from, but it not limited to, high-density polyethylene (HDPE) and polypropylene (PP).

The core layer 1340 is formed from a second, different polymeric material, also referred to as the core layer material. In this embodiment, the second polymeric material is a different color than the first polymeric material, but the second polymeric material can be selected with any desired material type, material characteristic, material quality, material type (i.e. virgin or regrind), and the like. As can be seen in the image of an experimentally produced preform 1300 shown in FIG. 16C, the core layer 1320 is made of a purple colored material, while the first polymeric material is a generally translucent material. In some embodiments, rather than being without color, the first polymeric material could be a different color than the second polymeric material. Both the first and second polymeric materials could be made from, but are not limited to, a homopolymer, copolymer, and blend of polyethylene terephthalate (PET). It is contemplated that different polymeric materials, which may have different physical, aesthetic and/or cost properties, could be used for the core layer 1340 and/or the skin layers 1320, 1325.

The core layer 1340 includes localized regions of increased radial thickness (see FIGS. 16A, 16B). Due to the increased radial thickness of the purple core layer, the purple color is more present and the preform 1300 (and its eventual final-shaped container) is differently colored in the localized regions of greater thickness. Specifically, in the illustrated embodiment the core layer includes two wider localized regions 1342 and two narrower localized regions 1344. In corresponding regions of the outer skin layer 1320, the outer skin layer 1320 also has localized regions of thinner material. The purple material core layer 1340, due to the localized regions of thicker core layer 1340 and thinner skin layer 1320 about a longitudinal axis of the preform 1300 creates four longitudinally-extending stripes in the preform 1300 that can be seen from an exterior of the preform 1300. It should be noted that in alternative non-limiting embodiments of the present technology, there could be more or fewer ones of the localized regions of thicker core layer 1340 and thinner skin layer 1320. By the same token, all of the localized regions of thicker core layer 1340 and thinner skin layer 1320 could be of the same dimension—either smaller or larger.

In some other non-limiting embodiments of the preform 1300, the core layer 1340 could include strain-hardening materials or materials of different viscosity, such as described above for other embodiments of preforms according to this technology. In such an embodiment, stretching and blow-molding of the preform into the final shaped container could be at least partially governed by the different thickness of the localized regions of the core layer 1340.

Figure 18:
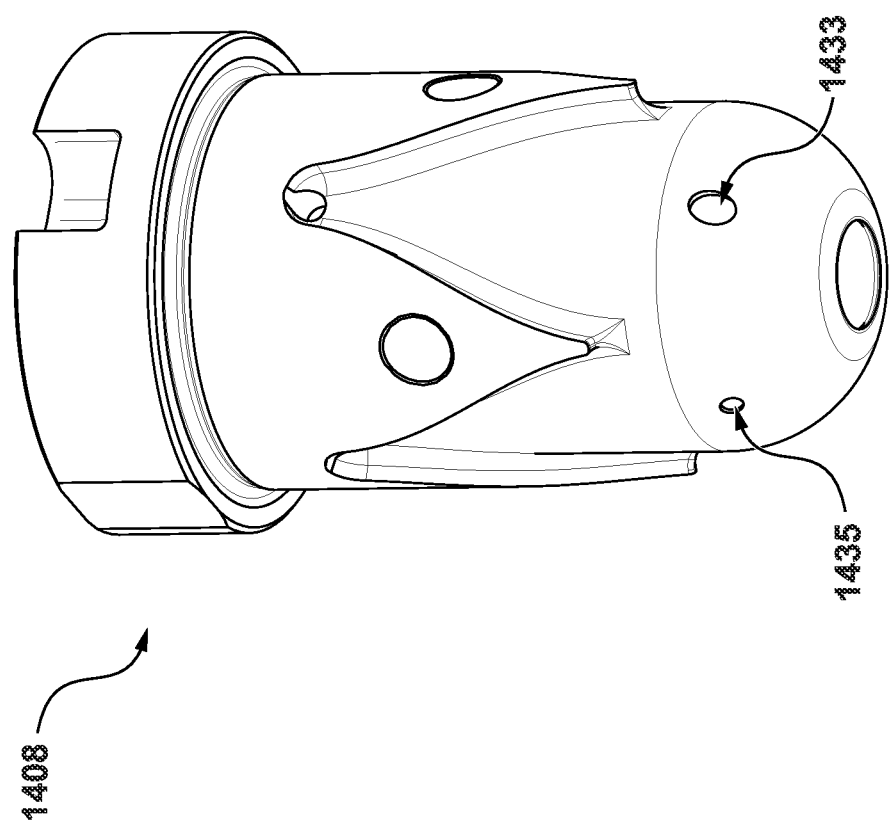
FIG. 18 is a perspective view of an intermediate nozzle insert of the hot runner nozzle of FIG. 17.

With reference to FIGS. 17 and 18, the hot runner nozzle 1400 used to create the preform 1300 will now be described in more detail. While the use of the hot runner nozzle 1400 will be described with respect to formation of the preform 1300, it is also contemplated that the hot runner nozzle 1400 could be used to create different embodiments of molded articles and multilayer preforms.

The hot runner nozzle 1400 comprises an inner nozzle insert 1406 (also referred to as a first nozzle insert 1406), an intermediate nozzle insert 1408 (also referred to as a second nozzle insert 1408), and an outer nozzle insert 1410 (also referred to as a third nozzle insert 1410). The inner nozzle insert 1406 defines an inner flow channel 1414 therein. The inner nozzle insert 1406 and the intermediate nozzle insert 1408 define an intermediate flow channel 1418 therebetween. The intermediate nozzle insert 1408 and the outer nozzle insert 1410 define an outer flow channel 1416 therebetween. Although not specifically illustrated, the hot runner nozzle 1400 further cooperates with a valve stem (not shown), similarly to the nozzle 1200 and the valve stem 1224 described above. The hot runner nozzle 1400 defines a longitudinal axis 1402, which is generally an operational axis of the nozzle 1400.

Both the inner flow channel 1414 and the outer flow channel 1416 convey the first polymeric material, which will eventually define for the preform 1300 the inner exterior skin layer 1325 and the outer exterior skin layer 1320, respectively. The intermediate flow channel 1418 is configured to receive the second polymeric material that will define the core layer 1340. The intermediate nozzle insert 1408 and the inner nozzle insert 1406 further cooperate to define an intermediate outlet 1420 of the intermediate flow channel 1418, where a majority of the second polymeric material flows through when the hot runner nozzle 1400 is in use.

The intermediate nozzle insert 1408 further defines four apertures disposed upstream and spaced from the intermediate outlet 1420. Specifically, the intermediate nozzle insert 1408 has two apertures 1433, separated by 180 degrees around the axis 1402, and two apertures 1435 disposed between and equidistant from each of the apertures 1433. The apertures 1433, 1435 are arranged to provide a fluid connection between the intermediate flow channel 1418 and the outer flow channel 1416.

As the intermediate flow channel 1418 is fluidly connected to the outer flow channel 1416 upstream of the intermediate outlet 1420, via the apertures 1433, 1435, the distribution of core layer material versus outer skin layer material is modified in localized regions downstream from the apertures 1433, 1435. When in use, at least a portion of the second polymeric material (i.e. the core layer material) melt flow passing through the intermediate flow channel 1418 passes through the apertures 1433, 1435 into the outer flow channel 1416.

The core layer material passing through the apertures 1433, 1435 then forms the localized regions of increased radial thickness 1342, 1344 illustrated in FIGS. 16A-D. The portion of the core layer material passing from the intermediate flow channel 1418 and into the outer flow channel 1416 generally join together again in the preform 1300, where those separated streams of the core layer material form a core layer 1340 of greater thickness at that point. In so doing, a portion of the core layer material also displaces a portion of the skin layer material in the outer flow channel 1416, as can be seen in the Figures, in localized regions corresponding to the locations of the apertures 1433, 1435. As can be seen in cross-section, the larger apertures 1433 allow through more core layer material then the smaller apertures 1435, leading to greater increase in the radial thickness of the core layer 1340.

It is contemplated that the intermediate nozzle insert 1408 could define more or fewer apertures 1433, 1435, depending on the specific implementation or application. Some such variations are explored in following portions of the description. Similarly, placement, size, and orientation of the apertures 1433, 1435 could vary, as will be explored in further embodiments of hot runner nozzles and nozzle inserts.

Figure 21:
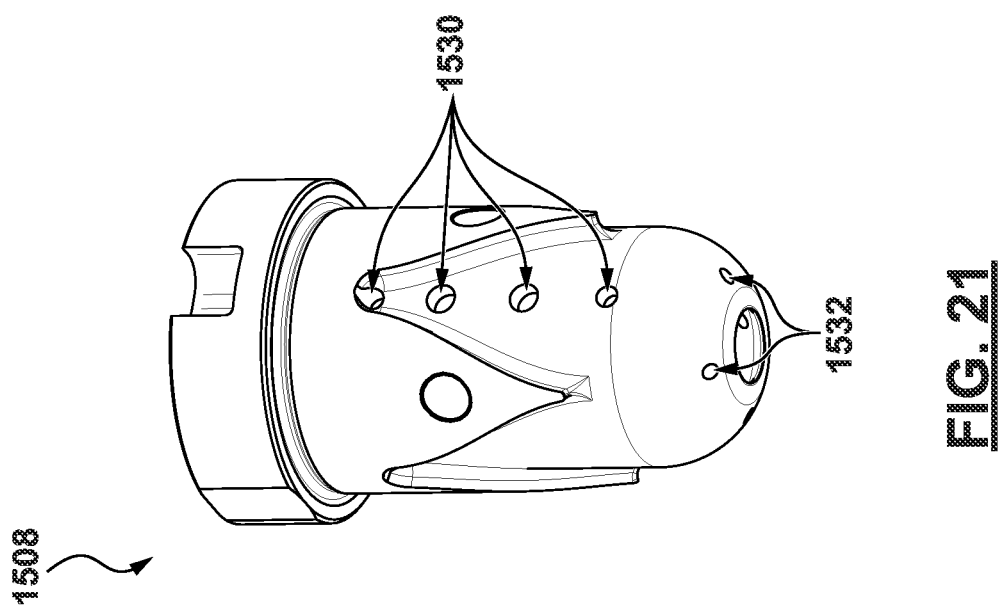
FIG. 21 is a perspective view of the intermediate nozzle insert of FIG. 19.

With reference to FIGS. 19 to 21, another non-limiting embodiment of a hot runner nozzle design, specifically including an intermediate nozzle insert 1508, for producing at least some of the preform designs presented above, will now be described. While not illustrated explicitly, the intermediate nozzle insert 1508 can be used in the hot runner nozzle 1400 in place of the intermediate nozzle insert 1408.

In this non-limiting embodiment, the intermediate nozzle insert 1508 includes a total of 20 apertures for fluidly connecting the intermediate flow channel to the outer flow channel. The intermediate nozzle insert 1508 defines four circular, horizontally arranged apertures 1530 disposed along each of four longitudinally extending lines, each line of apertures 1530 being equidistant, around the operational axis, from its neighboring line. The intermediate nozzle insert 1508 further defines four smaller circular apertures 1532 disposed about the bottom portion of the intermediate nozzle insert 1508.

By controlling flow rates, it is also contemplated that the extent of core layer radial thickness variation could be managed. For example, by varying flow rate through a particular cycle, addition variation in the localized core layer radial thickness along the longitudinal direction could be produced.

Figure 23:
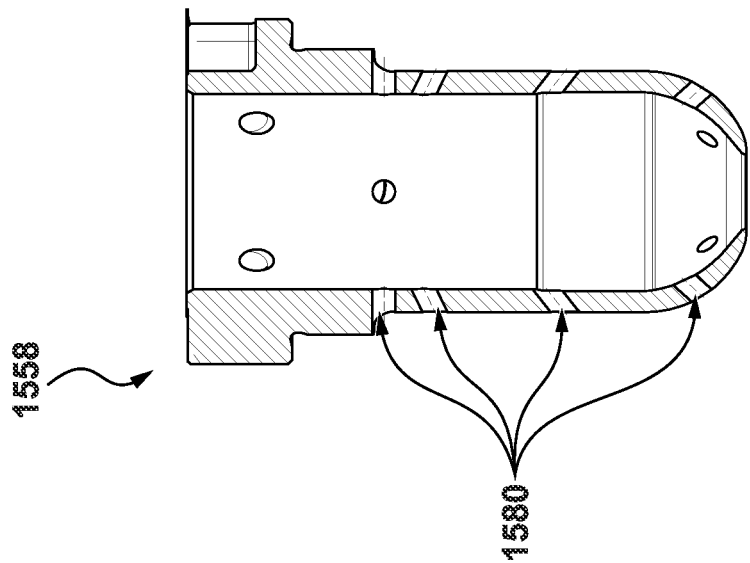
FIG. 23 is a cross-sectional view of the intermediate nozzle insert of FIG. 22, taken along line 23-23 of FIG. 22.
Figure 22:
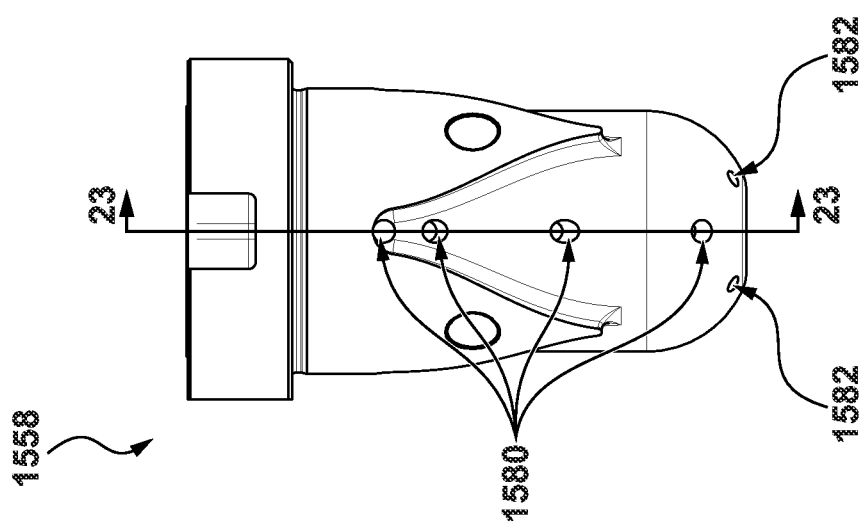
FIG. 22 is a side view of an intermediate nozzle insert of yet another embodiment of an intermediate nozzle insert of a hot runner nozzle, the nozzle insert and the hot runner nozzle being suitable for implementing embodiments of the present technology.

With reference to FIGS. 22 and 23, another non-limiting embodiment of a hot runner nozzle design, specifically an intermediate nozzle insert 1558, for producing at least some of the preform designs presented above, will now be described. While not illustrated explicitly, the intermediate nozzle insert 1558 can be used in the hot runner nozzle 1400 in place of the intermediate nozzle insert 1408.

In the non-limiting embodiment of the intermediate nozzle insert 1558, hot runner nozzle includes a total of 20 apertures for fluidly connecting the intermediate flow channel to the outer flow channel. The intermediate nozzle insert 1508 defines four circular apertures 1580 disposed along each of four longitudinally extending lines, each line of apertures 1530 being equidistant, around the operational axis, from its neighboring line. The apertures 1580 are arranged at various angles, the apertures 1580 generally being oriented at a greater angle to horizontal lower down the operational axis. The intermediate nozzle insert 1558 further defines four smaller circular apertures 1582 disposed about the bottom portion of the intermediate nozzle insert 1558, similarly to the intermediate nozzle insert 1508.

As can be seen in this non-limiting embodiment, the apertures 1580 need not all be arranged at a same angle with respect to the operational axis. The apertures 1580 further need not be equally spaced, as can be seen from at least the top two apertures 1580 along each longitudinal line. It is contemplated that the intermediate nozzle insert 1558 could include more or fewer apertures, depending on the specific embodiment.

With reference to FIGS. 24 and 25, another non-limiting embodiment of a hot runner nozzle design, specifically an intermediate nozzle insert 1608, for producing at least some of the preform designs presented above, including at least the preform 400 illustrated in FIGS. 4A and 4B, will now be described in more detail.

In the non-limiting embodiment of the intermediate nozzle insert 1608, hot runner nozzle includes two apertures 1630. Each aperture 1630 is in the form of a curved slot, which allows core layer material to pass from the intermediate flow channel into an interior side of the outer flow channel. The resulting core layer, as is illustrated in FIGS. 4A and 4B, is slightly thickened along a wide portion of the core layer circumference.

In some embodiments, the apertures 1630 could be larger or smaller than illustrated. It is also contemplated that the intermediate nozzle insert 1608 could include additional apertures, either in the form of the apertures 1630 or in a different form. It is also contemplated that for some embodiments, the apertures 1630 could be defined in an inner nozzle insert rather than the intermediate nozzle insert 1608.

Figure 26:
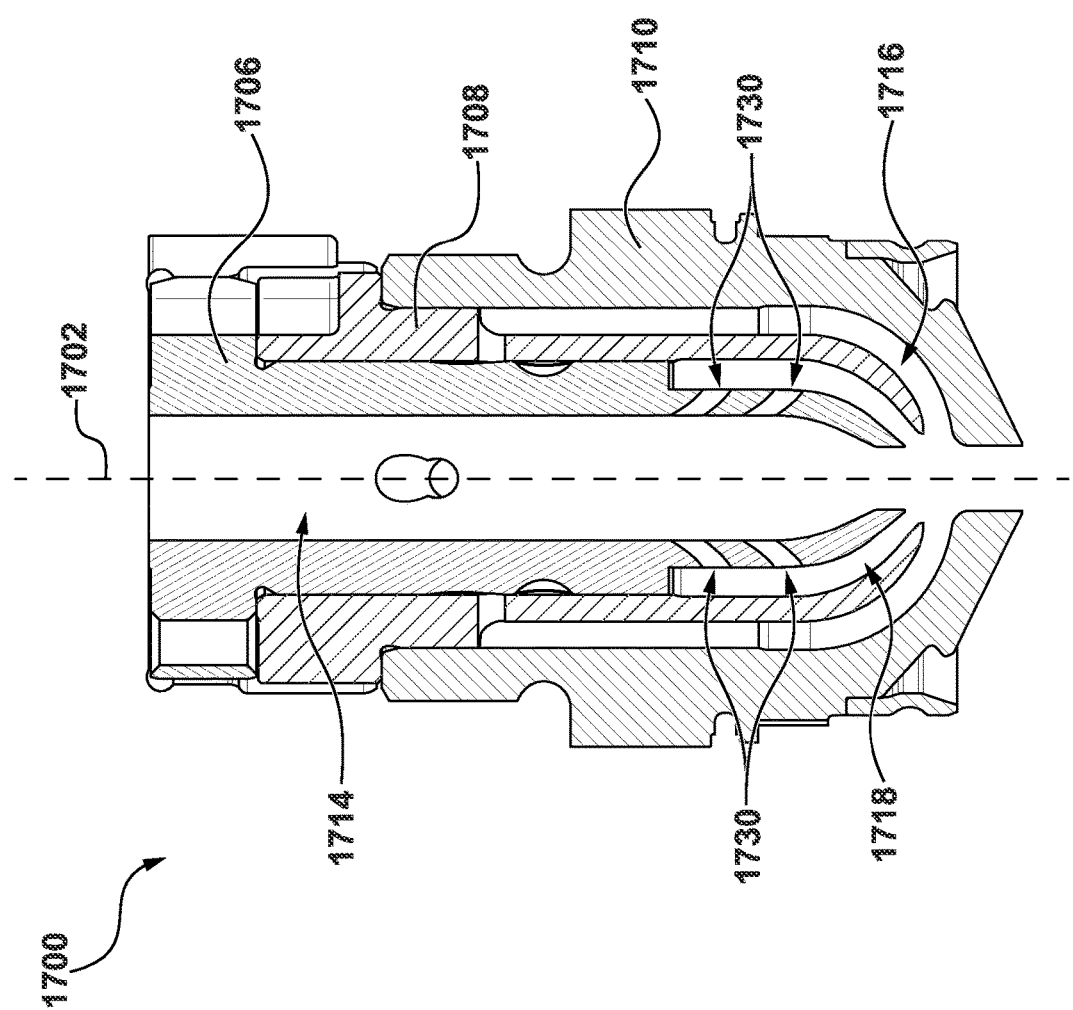
FIG. 26 is a cross section of yet another embodiment of a hot runner nozzle (the cross section being taken along an operational axis of the hot runner nozzle), the hot runner nozzle being suitable for implementing embodiments of the present technology.

With reference to FIG. 26, an illustrative example of a hot runner nozzle 1700 for producing at least some of the preform designs presented above will now be described.

The hot runner nozzle 1700 comprises an inner nozzle insert 1706 (also referred to as a first nozzle insert 1706), an intermediate nozzle insert 1708 (also referred to as a second nozzle insert 1708), and an outer nozzle insert 1710 (also referred to as a third nozzle insert 1710). The inner nozzle insert 1706 defines an inner flow channel 1714 therein. The inner nozzle insert 1706 and the intermediate nozzle insert 1708 define an intermediate flow channel 1718 therebetween. The intermediate nozzle insert 1708 and the outer nozzle insert 1710 define an outer flow channel 1716 therebetween. Although not specifically illustrated, the hot runner nozzle 1700 further cooperates with a valve stem (not shown), similarly to the nozzle 1200 and the valve stem 1224 described above. The hot runner nozzle 1700 defines a longitudinal axis 1702, which is generally an operational axis of the nozzle 1700.

Both the inner flow channel 1714 and the outer flow channel 1716 convey the first polymeric material, which will eventually define an inner exterior skin layer and an outer exterior skin, respectively, of a molded article produced by the hot runner nozzle 1700. The intermediate flow channel 1718 is configured to receive the second polymeric material that will define the core layer of the molded article.

The inner nozzle insert 1706 further defines four apertures disposed upstream and spaced from an outlet of the inner nozzle insert 1706. Specifically, the inner nozzle insert 1706 has four apertures 1730. The apertures 1730 are arranged to fluidly connect the inner flow channel 1714 to the intermediate flow channel 1718.

Similarly to the above described hot runner nozzles, the hot runner nozzle 1700 produces, when in use, molded articles that have core layers with localized regions of modified radial thickness. In this embodiment, a portion of the material flowing through the inner flow channel 1714 will divert into the intermediate flow channel 1718, displacing a portion of the core layer material. This causes localized regions of decreased radial thickness of the core layer. It is contemplated that the inner nozzle insert 1706 could define more or fewer apertures 1730 therein.

Figure 27:
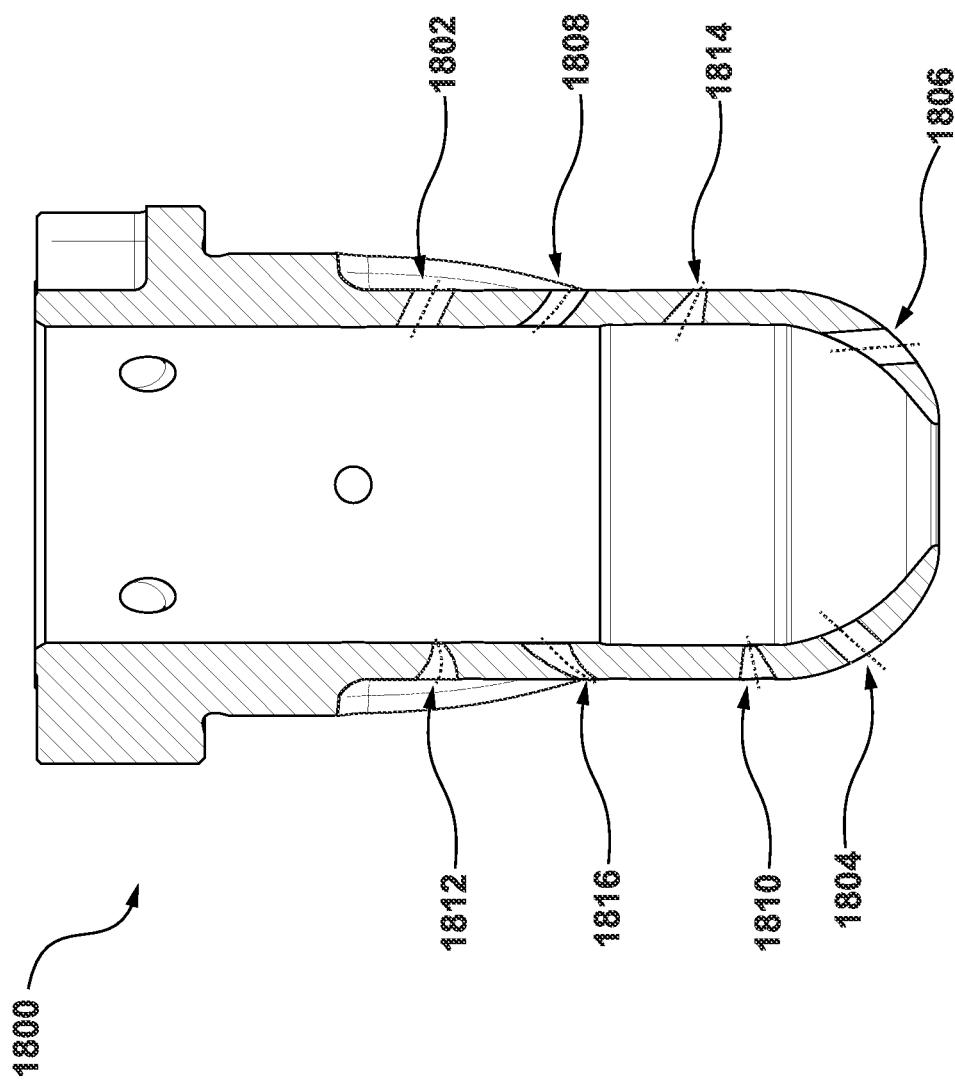
FIG. 27 is a cross-sectional view of an intermediate nozzle insert of a hot runner nozzle (the cross section being taken along an operational axis of the hot runner nozzle) illustrating various aperture embodiments.

With reference to FIG. 27, an illustrative example of an intermediate nozzle insert 1800 with different, non-limiting embodiments of apertures. While illustrated on the intermediate nozzle insert 1800, it is also contemplated that each of the example apertures could be implemented with an inner nozzle insert, such as in the non-limiting embodiment of the hot runner nozzle 1700.

As is described with respect to at least the nozzle inserts 1408, 1508, 1558, 1608, and 1706, the apertures as developed in the present technology, upstream and off-set from the material main outlets, allow a portion of the core layer material to pass from the intermediate flow channel into either the inner flow channel or the outer flow channel. In so doing, the molded articles produced have a core layer with localized regions of increased radial thickness. Further, a portion of the core layer material can displace a portion of the skin layer material about the localized regions.

Depending on various factors, the apertures used can be of different forms. These factors could include, but are not limited to: properties of the particular materials being used in the skin layers, the core layer, or both; different cycle parameters of the nozzle when in use; and the desired amount of variation in the core layer radial thickness.

In some embodiments, the apertures can be generally cylindrical and angled, such as apertures 1802 and 1804. In some embodiments, the apertures can be generally cylindrical and generally parallel to the operational axis, such as the aperture 1806. Depending on specifics of the embodiment, the apertures could be curved, such as the aperture 1808. In some embodiments, the apertures can expand to be larger as the aperture extends away from the intermediate flow channel, such as the aperture 1810 (with generally linear walls) or the aperture 1812 (with curved walls). Similarly, in some embodiments the apertures can get narrower as they extend away from the intermediate flow channel, such as the aperture 1814 (with generally linear walls) or the aperture 1816 (with curved walls).

Choice of one or more of the above apertures 1802-1816 could depend on various factors, including the extent to which the core layer is meant to be modified, for instance, or if the core layer material crossing into the outer flow channel is meant to penetrate through the outer skin layer or to be nearer the surface of the preform produced. It is also contemplated that the apertures could be further varied, for example by having larger or smaller diameters than those illustrated. The relative spacing, orientation, and location of different apertures could further vary, depending on the particular embodiment. During use, it is also contemplated that any of stem position, injection speed, and injection timing, among other process variables, could be controlled to create different effects on the preform produced. It should be noted that various methods could be utilized to create the apertures, including, for example, electrical discharge machining and 3D printing of the nozzle inserts, but fabrication of the present technology is not meant to be so limited.

These are non-limiting examples of different apertures that could be defined in at least one of the intermediate nozzle insert and the inner nozzle insert, but still further different forms could be implemented. Depending on the embodiment, one or both of the intermediate and inner nozzle inserts could include as few as one aperture up to many apertures. It is also contemplated that in some embodiments, multiple versions of the apertures 1802-1816 (or other forms) could be implemented in a single embodiment.

Additionally, the shape and/or the placement of the core layer of preforms produced using the hot runner nozzles or inserts 1400, 1508, 1558, 1608, 1700, or 1800 could be selectively controlled by positioning of the valve stem 1224, as is described above.

With reference to FIGS. 28 to 31, another non-limiting embodiment of a hot runner nozzle 1900, specifically an inner nozzle insert 1906, for producing at least some of the preform designs presented above, will now be described.

The hot runner nozzle 1900 comprises an inner nozzle insert 1906, an intermediate nozzle insert 1908, and an outer nozzle insert 1910. The inner nozzle insert 1906 defines an inner flow channel 1914 therein, the inner flow channel 1914 including an outlet 1922. The inner nozzle insert 1906 and the intermediate nozzle insert 1908 define an intermediate flow channel 1918 therebetween. The intermediate nozzle insert 1908 and the outer nozzle insert 1910 define an outer flow channel 1916 therebetween. The inner nozzle insert 1906 and the intermediate nozzle insert 1908 further cooperate to define an intermediate outlet 1920 through which at least the core layer material passes. The outer nozzle insert 1910 further defines an outlet 1924 through which at least the outer exterior skin layer material passes. The hot runner nozzle 1900 also defines a longitudinal axis 1902, which is generally an operational axis of the nozzle 1900.

As can be seen from the Figures, the inner nozzle insert 1906 is formed such that the intermediate outlet 1920 has a non-uniform cross-section. As the core layer material passes out of the hot runner nozzle 1900, when in use, through the non-uniform intermediate outlet 1920, a molded article created using the hot runner nozzle 1900 would have a core layer having a non-uniform radial thickness about the axis 1902. As one non-limiting example, the preform 500 illustrated in FIGS. 5A and 5B could be created using the hot runner nozzle 1900. The core layer 540 of the preform 500 extends only partially around a circumference of the preform 500, corresponding to the partial intermediate flow channel 1918.

As can be seen in the Figures, the intermediate outlet 1920, and the outer outlet 1924 are immediately adjacent to one another. Specifically, the inner outlet 1922 and the outer outlet 1924 are arranged concentrically. Due to the form of the inner nozzle insert 1906, as will be discussed in more detail below, the intermediate outlet 1920 extends only partially around the axis 1902 of the hot runner nozzle 1900 and is disposed between only a portion of the concentrically arranged inner and outer outlets 1922, 1924.

Figure 28:
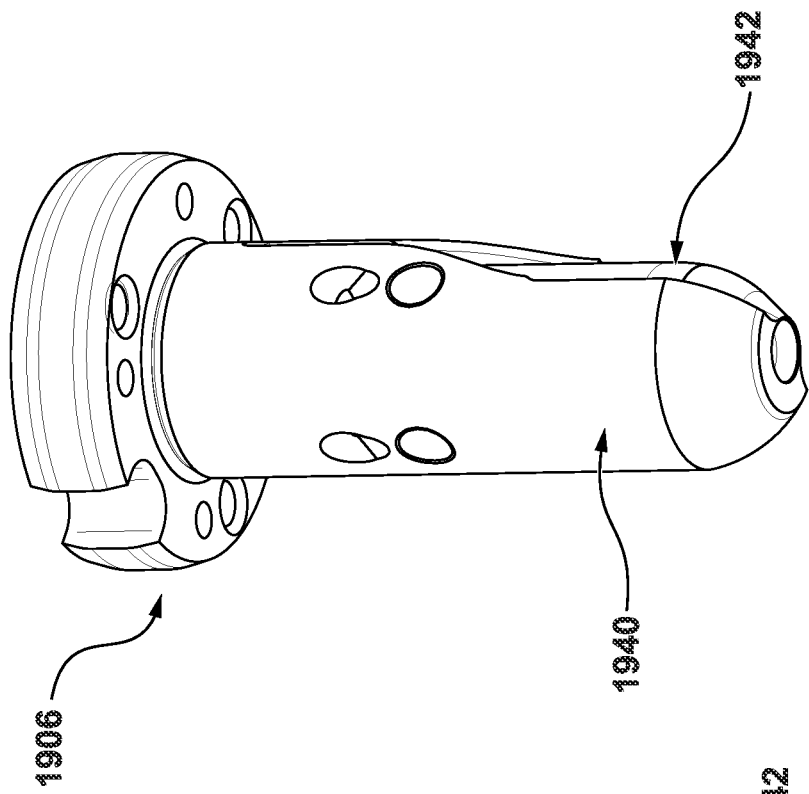
FIGS. 28 and 29 are perspective views of an embodiment of an inner nozzle insert of a hot runner nozzle suitable for implementing embodiments of the present technology.
Figure 29:
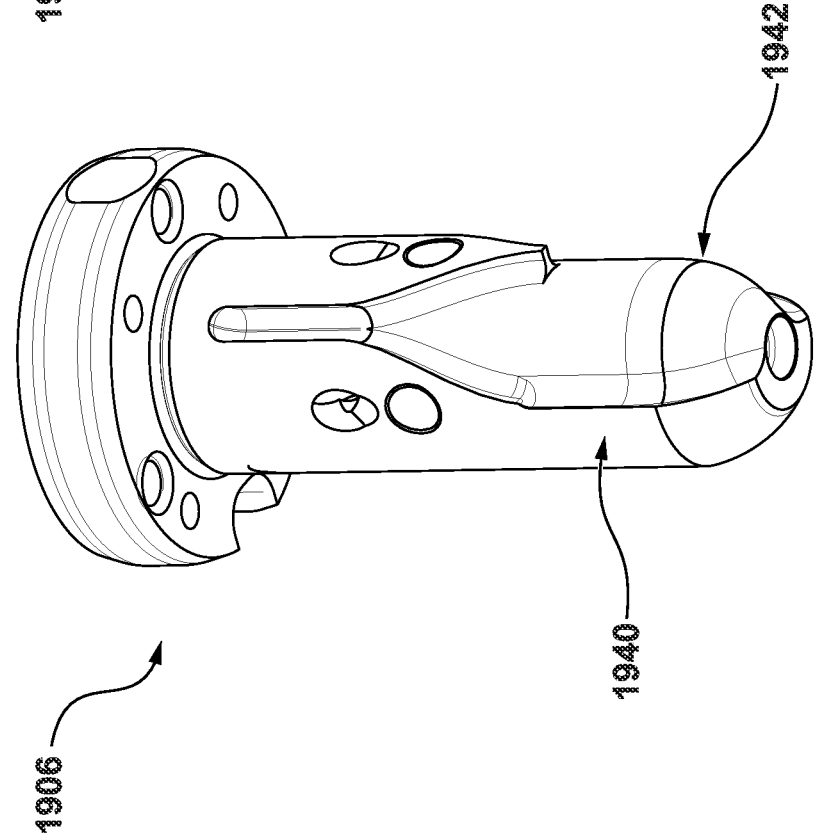
Figure 30:
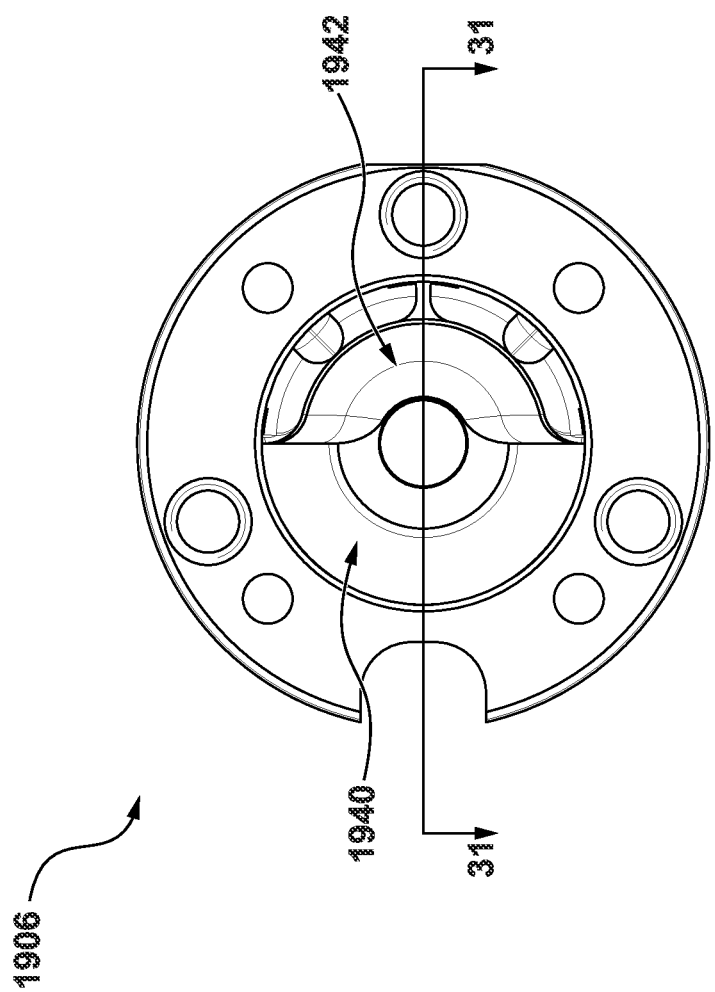
FIG. 30 is a bottom plan view of the inner nozzle insert of FIG. 28.
Figure 31:
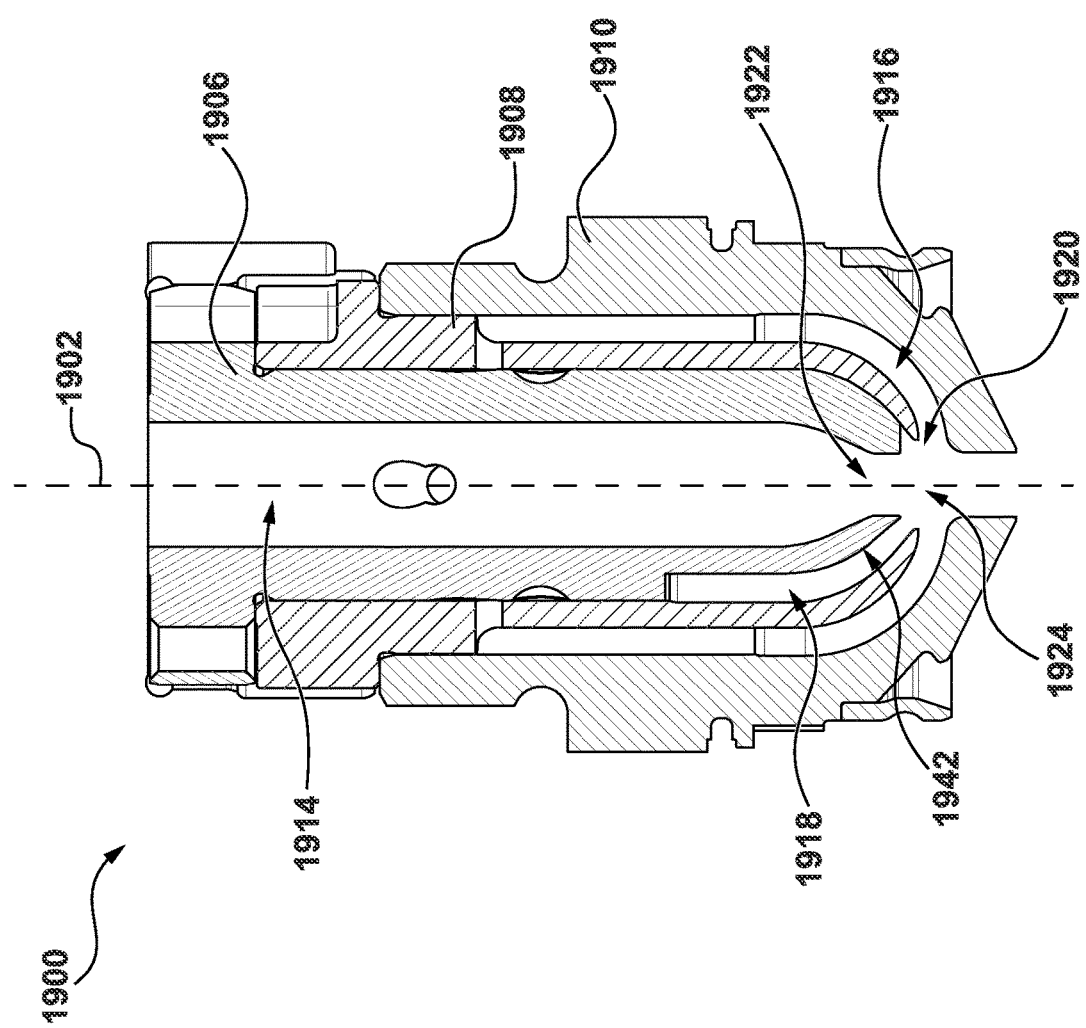
FIG. 31 is a cross-sectional view of the inner nozzle insert of FIG. 28 arranged in a hot runner nozzle, taken along line 31-31 of FIG. 30.

The inner nozzle insert 1906 has two general surface forms, as can be seen in FIGS. 28 and 29. The first surface form 1940 matches the form of an interior surface of the intermediate nozzle insert 1908. The second surface form 1942, when the inner nozzle insert 1906 is arranged in the hot runner nozzle 1900, is spaced from the interior surface of the intermediate nozzle insert 1908 to define the intermediate flow channel 1918. In the region of the surface form 1940, there is no core layer material flow, as the inner nozzle insert 1906 is in contact with the intermediate nozzle insert 1908. As such, as can be seen in preform 500, the core layer 540 only extends around a portion of the circumference of the preform 500.

In some non-limiting embodiments, it is contemplated that portions of the channels 1916, 1918 could be modified to compensate for an imbalance of flows in the channels 1916, 1918 due to their non-uniform nature. For example, in some embodiments the outer flow channel 1916 could be thinner in portions about the axis where the intermediate flow channel 1918 is defined, such that the total flow from the channels 1916, 1918 has a total flow volume that is similar or the same as portion of the nozzle 1900 where there is no intermediate flow channel 1918 defined, and all flow is coming only from the outer flow channel 1916. It is also contemplated that the form of the channels 1916, 1918 could be modified to balance pressure through the nozzle 1900, during use.

Broadly speaking the non-limiting embodiments of hot runner nozzles and nozzle inserts for conveying melt to a mold cavity described above are designed to deliver core layer material such that the molded articles produced in the mold cavity have a non-uniform radial thickness about a longitudinal axis of the molded article. Specifically, flow of material through the intermediate flow channel, when the hot runner nozzle is in use, is non-uniformly distributed about a longitudinal axis of the hot runner nozzle. The non-uniformity of the flow is generally attributable to surfaces of the intermediate nozzle insert and the inner nozzle which define the intermediate flow channel. In some of the above described embodiments of the present technology, the surfaces define apertures through which the core layer material passes to create localized increased core layer thickness. In other embodiments of the present technology, the surfaces form intermediate flow channels that do not extend uniformly about the hot runner nozzle axis, such that the core layer material is not uniformly distributed about the molded article.

It should be noted that even though the core layer depicted in the various embodiments of the present technology is not fully encapsulated in the gate portion of the preform (i.e. it is interrupted in the gate portion of the preform), in alternative non-limiting embodiments of at least those preforms depicted in FIGS. 3A, 4A, 8A, 10, 11, and 16A-D; the respective core layers can be fully encapsulated (i.e. be continuous) in the gate portions of the preforms.

The polymeric material used to form any of the foregoing non-limiting embodiments of multi-layer articles 300, 400, 500, 600, 700, 800, 900, 1000, 1100, 1300 can be chosen where one polymeric material is of a first color and the other polymeric material is of a second color in order to create a variation in color distribution in the final-shaped container, where color variation is governed by the selectively varied radial thickness of the core layer.

The polymeric material used to form the foregoing non-limiting embodiments of multi-layer articles 300, 400, 500, 600, 700, 800, 900, 1000, 1100, 1300 may be selected or otherwise modified to resist layer delamination. Where two adjacent layers are formed from polymeric materials that are prone to delamination a bonding agent may be employed to improve the bond therebetween. Related teachings on the provision of bonding agents is provided, for example, with reference to US patent application, US 2011/0262668, assigned to Graham Packaging Company L.P., incorporated by reference herein, and a journal article entitled 'Compatibilizer Additives for Improving the Delamination Resistance of PET/Pa-MXD6 Multilayer Coinjection Stretch Blow Molded Bottles' authored by Kris Akkapeddi and Brian Lynch of Graham Packaging Co., York, PA, U.S.A. and published by the Society of Plastics Engineers Bethel, CT, U.S.A. In the non-limiting example of a PET and HDPE interface a bonding agent such as, for example, Surlyn® (trademark of E. I. du Pont de Nemours and Company of Wilmington, Delaware, U.S.A.), Orevac® (trademark of Arkema S.A. of Colombes, France), or Aclyn® (trademark of Honeywell International Inc. of Morris Plains, New Jersey, U.S.A.) may be provided.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The description of the embodiments of the present technology provides only examples of the present technology, and these examples do not limit the scope of the present technology. It is to be expressly understood that the scope of the present technology is limited by the claims only. The concepts described above may be adapted for specific conditions and/or functions, and may be further extended to a variety of other applications that are within the scope of the present technology. Having thus described the embodiments of the present technology, it will be apparent that modifications and enhancements are possible without departing from the concepts as described.

The invention claimed is:

1. A hot runner nozzle for conveying melt to a mold cavity, the hot runner nozzle comprising:
    an inner nozzle insert defining an inner flow channel;
    an intermediate nozzle insert disposed around the inner nozzle insert,
        the intermediate nozzle insert and the inner nozzle insert defining an intermediate flow channel; and
    an outer nozzle insert disposed around the intermediate nozzle insert,
        the outer nozzle insert and the intermediate nozzle insert defining an outer flow channel,
    the intermediate nozzle insert and the inner nozzle insert cooperating to define an intermediate outlet,
    at least one of the inner nozzle insert and the intermediate nozzle insert further defining at least one aperture disposed upstream from the intermediate outlet, at least one aperture being arranged to fluidly connect with at least one of the inner flow channel and the outer flow channel.

2. The hot runner nozzle of claim 1, wherein, in use, when conveying the melt to the mold cavity:
    a first stream of melt of a first polymeric material flows through and exits the inner flow channel and the outer flow channel;
    a second stream of melt of a second polymeric material flows through the intermediate flow channel; and
    at least a portion of the second stream of melt passes through the at least one aperture from the intermediate flow channel to at least one of the inner flow channel and the outer flow channel.

3. The hot runner nozzle of claim 2, wherein:
    the intermediate nozzle insert defines the at least one aperture; and
    when in use, at least a portion of the second stream of melt passes through the at least one aperture from the intermediate flow channel to the outer flow channel.

4. The hot runner nozzle of claim 3, wherein the at least one aperture comprises:
    a first plurality of apertures defined along a first line extending longitudinally along the intermediate nozzle insert; and
    a second plurality of apertures defined along a second line extending longitudinally along the intermediate nozzle insert, the first line and the second line being separate from each other.

5. The hot runner nozzle of claim 2, wherein:
    the inner nozzle insert defines the at least one aperture; and
    when in use, at least a portion of the second stream of melt passes through the at least one aperture from the intermediate flow channel to the inner flow channel.

6. The hot runner nozzle of claim 5, wherein the at least one aperture comprises:
    a first plurality of apertures defined along a first line extending longitudinally along the inner nozzle insert; and
    a second plurality of apertures defined along a second line extending longitudinally along the inner nozzle insert, the first line and the second line being separate from each other.

7. The hot runner nozzle of claim 2, wherein the mold cavity is for defining, in use, a molded article having a core layer and a skin layer surrounding the core layer, the core layer being formed from the second polymeric material flowing through the intermediate flow channel, the core layer having a non-uniform radial thickness about a longitudinal axis of the molded article.

8. The hot runner nozzle of claim 1, wherein the at least one aperture comprises a plurality of apertures that fluidly connect the intermediate flow channel with at least one of the inner flow channel and the outer flow channel.

* * * * *